(12) United States Patent
Martin et al.

(10) Patent No.: US 11,072,991 B2
(45) Date of Patent: Jul. 27, 2021

(54) DEGRADABLE PLUG DEVICE FOR A PIPE

(71) Applicant: Specialised Oilfield Solutions Ltd, Aberdeen (GB)

(72) Inventors: George Bruce Martin, Aberdeen (GB); Michael C. Robertson, Arlington, TX (US); Antony F. Grattan, Arlington, TX (US); Douglas J. Streibich, Arlington, TX (US)

(73) Assignee: Robertson Intellectual Properties, LLC, Mansfield, TX (US)

( * ) Notice: Subject to any disclaimer, the term of this patent is extended or adjusted under 35 U.S.C. 154(b) by 0 days.

(21) Appl. No.: 16/096,624

(22) PCT Filed: Apr. 26, 2017

(86) PCT No.: PCT/GB2017/000061
§ 371 (c)(1),
(2) Date: Oct. 25, 2018

(87) PCT Pub. No.: WO2017/187117
PCT Pub. Date: Nov. 2, 2017

(65) Prior Publication Data
US 2020/0032611 A1 Jan. 30, 2020

(30) Foreign Application Priority Data

Apr. 30, 2016 (GB) .................................. 1607619

(51) Int. Cl.
*E21B 33/12* (2006.01)
*F16L 55/11* (2006.01)
*F16L 55/42* (2006.01)

(52) U.S. Cl.
CPC .......... *E21B 33/1208* (2013.01); *E21B 33/12* (2013.01); *F16L 55/11* (2013.01); *F16L 55/42* (2013.01)

(58) Field of Classification Search
CPC ...... E21B 33/1208; E21B 33/12; E21B 29/02; F16L 55/42; F16L 55/11; F16L 55/128
See application file for complete search history.

(56) References Cited

U.S. PATENT DOCUMENTS

| 9,062,543 B1 | 6/2015 | Snider et al. | |
| 2008/0135249 A1* | 6/2008 | Fripp | E21B 43/088 166/285 |

(Continued)

OTHER PUBLICATIONS

ISR 10072017, International Search Report cited in the corresponding PCT application No. PCT/GB2017/000061; dated Oct. 7, 2017; 2 pages.

*Primary Examiner* — George S Gray
(74) *Attorney, Agent, or Firm* — Matthews, Lawson, McCutcheon & Joseph, PLLC

(57) ABSTRACT

A degradable plug device for a pipe has an outer plug body and an inner plug for preventing fluid flow through the pipe until the inner plug has been removed from the outer plug body. The outer plug body and the inner plug are of a degradable material. The inner plug has a chamber with at least one port to the exterior of the inner plug. The exposed surfaces of the degradable plug have a protective layer thereon. The inner plug is disposable in at least a first position, in which the inner plug prevents the fluid flow through the pipe. The inner plug is adapted to undergo, in use, a degradation initiation operation such that fluid is able to enter the chamber via the at least one port to initiate corrosion or dissolution of the inner plug from inside the chamber.

19 Claims, 8 Drawing Sheets

(56) References Cited

U.S. PATENT DOCUMENTS

2012/0211239 A1     8/2012  Kritzler et al.
2014/0190685 A1*    7/2014  Frazier ................ E21B 33/1293
                                                    166/250.01
2014/0246209 A1*    9/2014  Themig ................ E21B 33/124
                                                    166/374
2016/0356137 A1*   12/2016  Hardesty ................ E21B 43/14

* cited by examiner

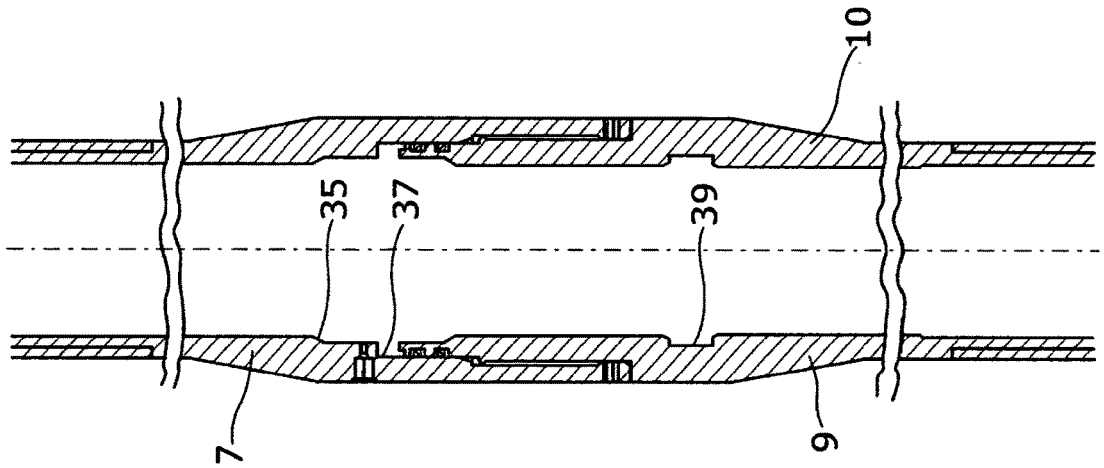
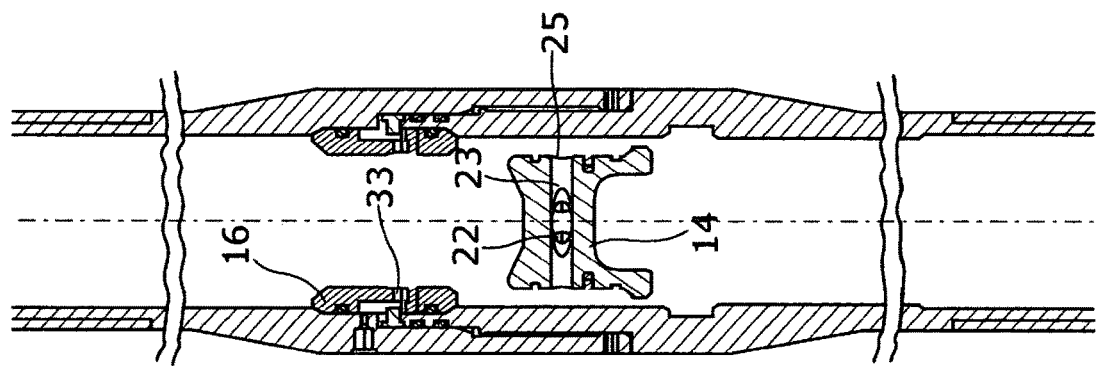
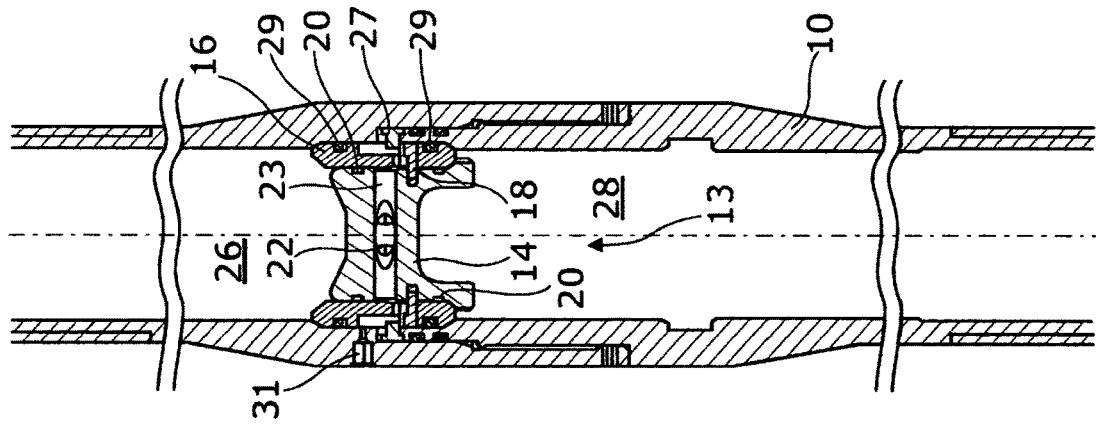

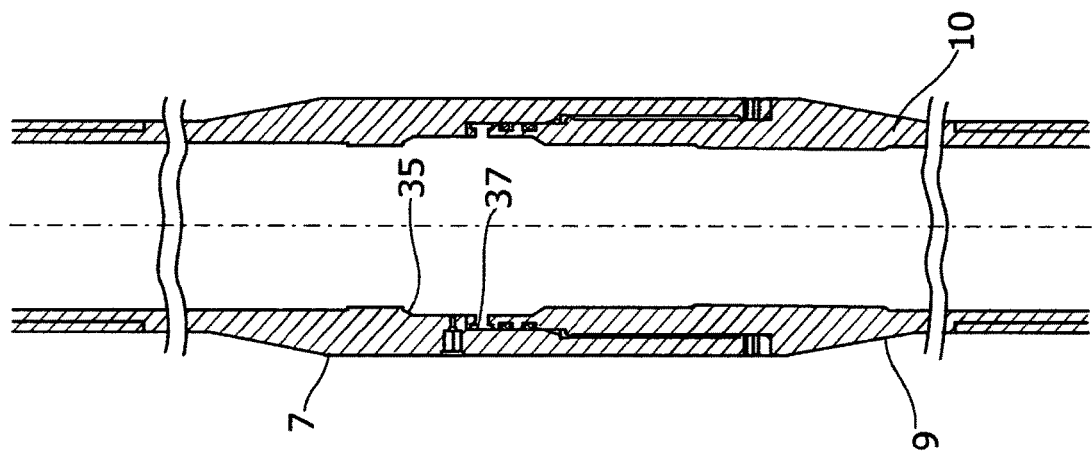
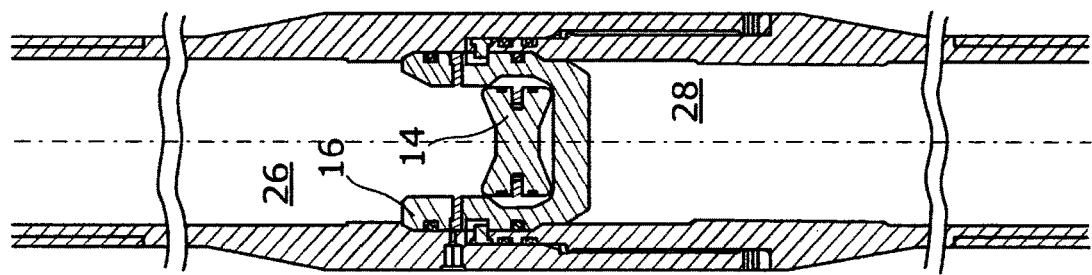
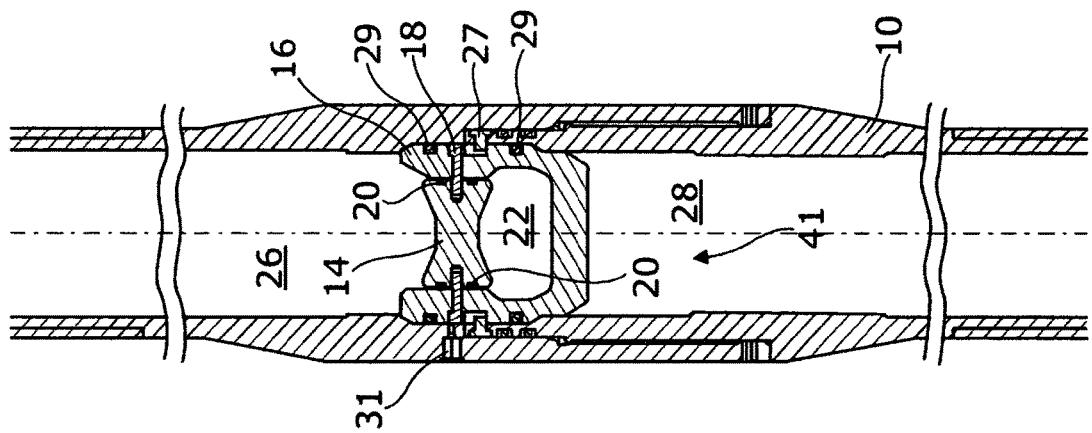

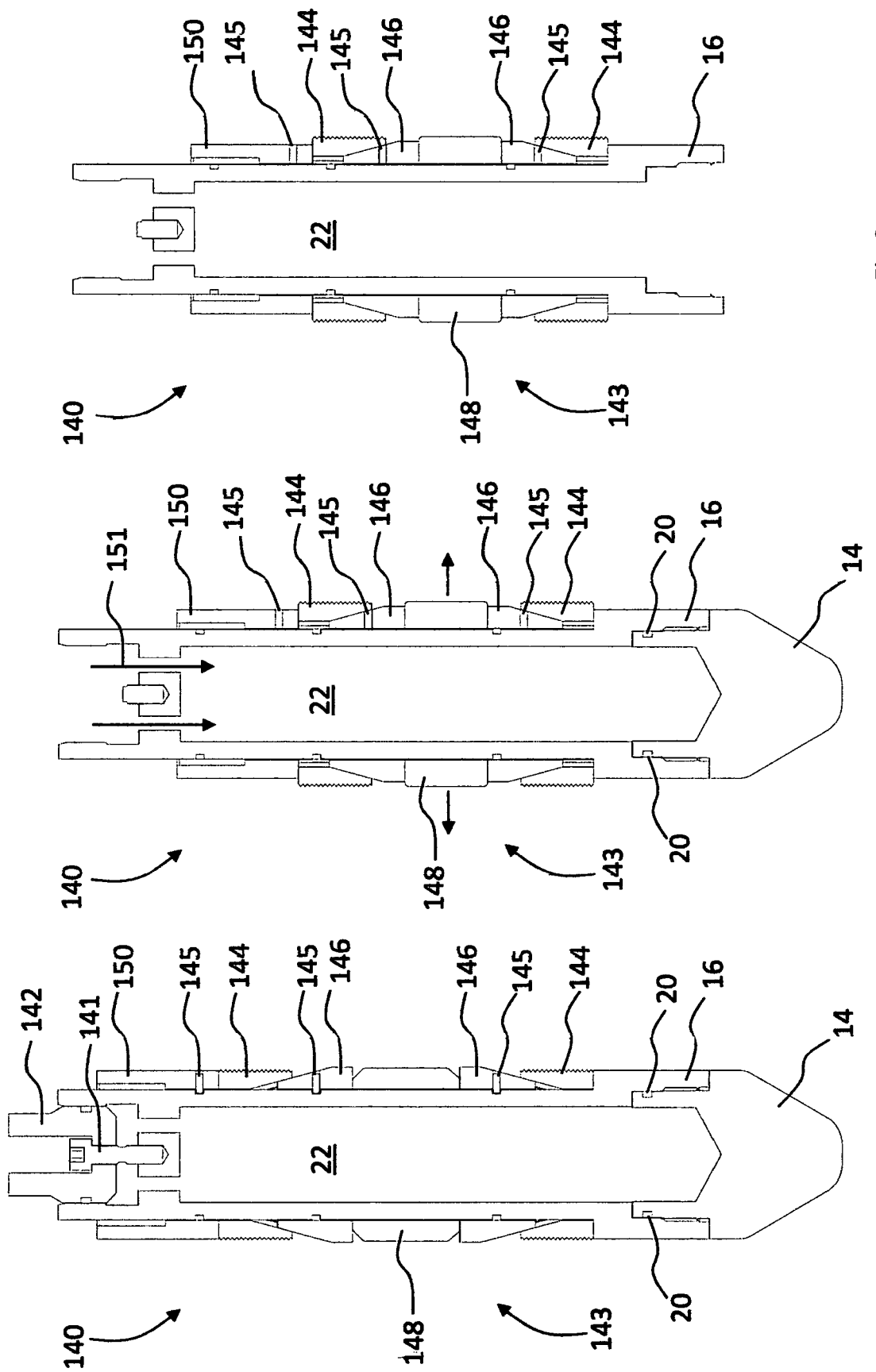

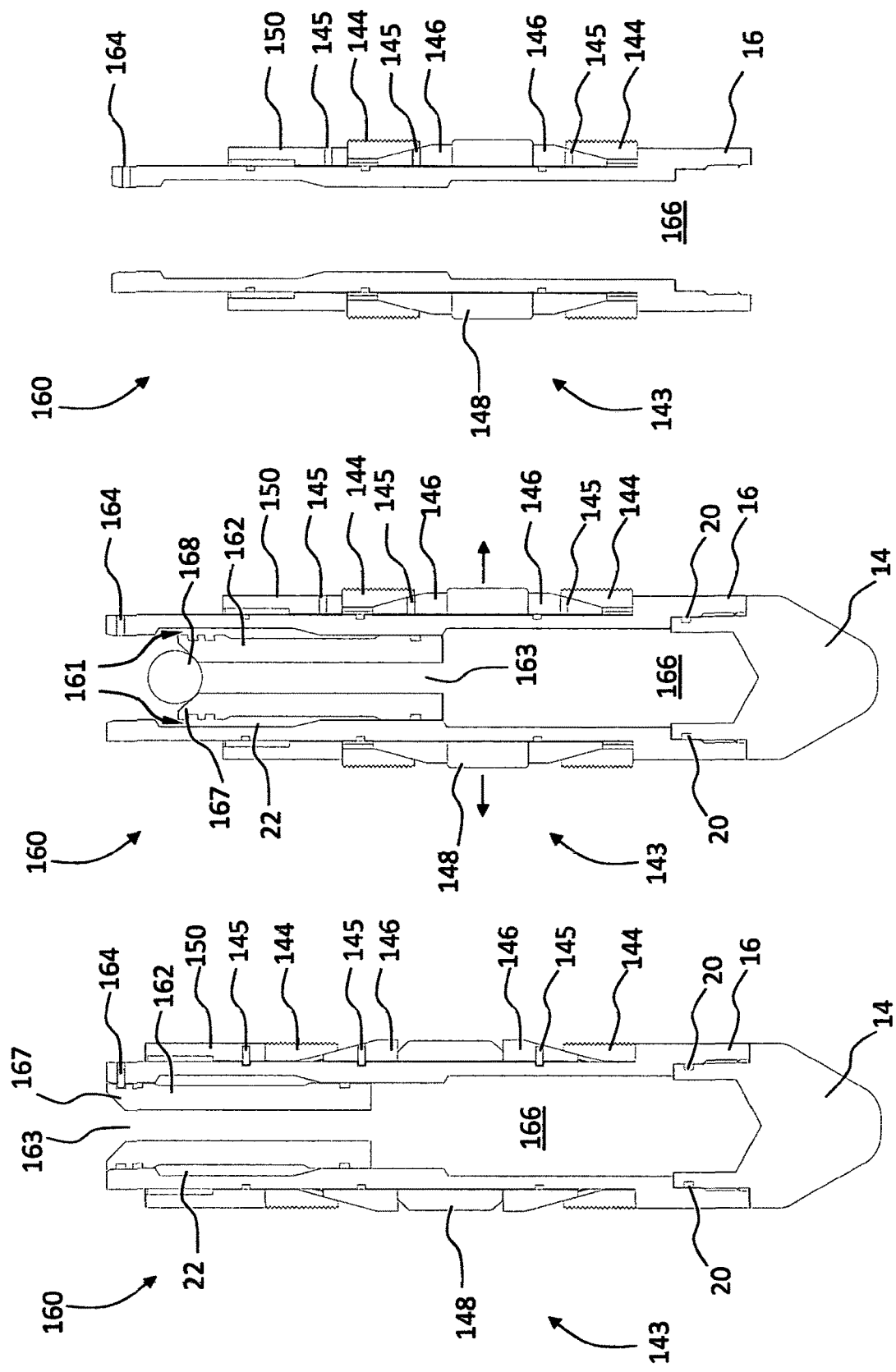

DEGRADABLE PLUG DEVICE FOR A PIPE

RELATED APPLICATION DATA

This application is a U.S. national stage of and claims priority benefit to prior filed international application no. PCT/GB2017/000061, filed Apr. 26, 2017, and which claims priority to British national application no. 1607619.2, filed Apr. 30, 2016. The entire contents of these prior filed applications are hereby incorporated by reference herein.

TECHNICAL FIELD

The invention relates to a degradable plug device for a pipe, an apparatus with a pipe and the plug, and a method for operation thereof.

BACKGROUND

A part of an oil or gas well may be required to be temporarily blocked to control the flow of fluids, or to actuate tools within the well. Such temporary blocking may also be required to allow pressure testing of the pipework of the well, for example, casings, plugs, packers, liners etc. It is known to insert a magnesium ball into the well to temporary block a part of the well. The ball typically rests on a collar or restriction within the pipework, and blocks it so that the required operation can be completed. When the operation has been completed the magnesium ball may be dissolved by brine which is present in the well fluid. Alternatively, an acid may be used to provide faster dissolving of the magnesium ball. Typically the magnesium ball dissolves over a period of a few hours to a few days.

A problem with such a magnesium ball is that it only allows pressure to be maintained in the well fluid from above. Furthermore, the corrosion of the magnesium ball is not readily controllable in that it may start to corrode as soon as it enters the well. In addition, with such an arrangement a restriction in the well is still present after the magnesium ball has been removed, which means that the full bore of the pipework is not useable for fluid flow.

It is also known to provide a downhole dissolvable plug. A problem with such a plug is that it may not dissolve sufficiently quickly when required to be removed. Furthermore, the dissolving of the plug may be dependent on temperature, which leads to a less controlled removal of the plug.

A further problem is that a plug may provide a blocking obstacle if it flows downstream between dissolution initiation and completion. The plug may also become stuck leading to additional cost and time to retrieve or remove it.

A further problem is that with known systems, limited means are provided for initiating dissolution of the plug, and more options are required. Whereas other ways of temporarily blocking the pipework are known they generally add risk to operation of the well, and increase costs.

It is broadly an object of the present invention to address one or more of the above mentioned disadvantages of the previously known apparatus.

SUMMARY

What is required is an apparatus which may reduce or minimise at least some of the above-mentioned problems.

According to a first aspect of the invention, there is provided a degradable plug device for a pipe having an outer plug body and an inner plug for preventing fluid flow through the pipe until the inner plug has been removed from the outer plug body, the outer plug body and the inner plug being of a degradable material, the inner plug having a chamber with at least one port to the exterior or the inner plug, the exposed surfaces of the degradable plug having a protective layer thereon, wherein the inner plug is disposable in at least a first position, in which the inner plug prevents said fluid flow through the pipe, and is adapted to undergo, in use, a degradation initiation operation such that fluid is able to enter the chamber via the at least one port to initiate corrosion or dissolution of the inner plug from inside the chamber.

Such a device provides the advantage that the plug device can be made to dissolve quickly when required to do so, for example, by controlling the position of the first port and thereby the ingress of fluid into the chamber, or by controlling the composition of the degradable material.

The chamber and/or the at least one port may comprise one or more bores of the inner plug. The chamber and/or the at least one port may comprise a plurality of bores that intersect each other. Preferably the one or more bores are radial bores of the inner plug. In one embodiment, the inner plug has three radial bores.

According to an alternative characterisation of a first aspect of the invention, there is provided a degradable plug device for a pipe having an outer plug body and an inner plug for preventing fluid flow through the pipe until the plug device has been removed from the pipe or until the inner plug has been removed from the outer plug body, the outer plug body and the inner plug being of a degradable material, the exposed surfaces of the degradable plug having a protective layer thereon, wherein the inner plug is disposable in at least a first position, in which the inner plug is in sealing contact with the outer plug body so as to define a chamber, the inner plug being adapted to undergo, in use, a degradation initiation operation such that fluid is able to enter the chamber to initiate corrosion or dissolution of the inner plug and/or the outer plug body from inside the chamber.

Preferably, the outer plug body is cup-shaped. In said first position, the inner plug may be disposed at the mouth of the cup-shaped outer plug body, thereby forming the chamber.

In one embodiment, the degradation initiation operation comprises moving the inner plug relative to the outer plug body between the first position and a second position, in which fluid is able to enter the chamber to initiate corrosion or dissolution of the inner plug from inside the chamber.

Preferably the outer plug body and the inner plug are connected to each other with a shear device. The shear device may be a shear ring, a shear pin, or a shear sleeve. This ensures that the inner plug is retained in position and further assists in controlling the timing of dissolution initiation.

The shear device may be made of the degradable material or a non-degradable material. This ensures that the shear device dissolves when required to do so.

In one embodiment, the inner plug is adapted to move out of the first position when a pressure of the fluid on one side of the inner plug exceeds a first pressure threshold.

Therefore, the movement can be readily remotely controlled by varying the pressure adjacent the inner plug from a distal end of the pipe. In one embodiment, the first pressure threshold is between 1300 to 206800 kPa, and in one embodiment approximately 31000 kPa.

In another embodiment, the inner plug is adapted to move out of first position when a force applied by an actuating member to one side of the inner plug exceeds a force threshold. This advantageously facilitates remote actuation and control of plug dissolution by application of physical force direct to the plug, for example by remotely operated hammer or rod.

Preferably, the shear device is adapted to fail when the pressure of the fluid on one side of the inner plug exceeds the first pressure threshold or when the force applied to the one side of the inner plug exceeds the second force threshold. Thus, further control is provided, and avoidance of untimely/premature movement of the inner plug is prevented, through appropriate choice of the threshold at which the shear device fails.

In one embodiment, the inner plug is adapted, upon failure of the shear device, to be released from the outer plug body.

In another embodiment, the inner plug is adapted, upon failure of the shear device, to move a predetermined distance relative to the outer plug body. The predetermined distance may be in the range 5 to 25 cm. Accordingly, where desired, consequent falling of the inner plug into the fluid flow, potentially causing an undesirable blockage downstream, can be avoided.

In the case of the above alternative characterisation, after release; or after movement by the predetermined distance, the inner plug is free of the outer plug body and resides within the outer plug body.

Preferably, in the second position, fluid is able to enter the chamber via the at least one port. This influx enables the amount of surface area of the inner plug with which the fluid is in contact to be increased/maximised, thereby speeding up dissolution.

Preferably, 'O' ring seals are provided between the outer plug body and the inner plug to provide a seal there between. This assists in controlling the start point of dissolution by preventing ingress of the fluid until the appropriate initiation operation has occurred.

Preferably, the 'O' ring seals comprise a first 'O' ring seal axially disposed between the at least one port and a first side of the inner plug and a second 'O' ring seal axially disposed between the at least one port and a second side of the inner plug, which is opposite the first side.

Preferably, the predetermined distance is such as to move the at least one port from a position where the at least one port is disposed between 'O' ring seals, to a position in which the at least one port is not disposed between 'O' ring seals, whereby the chamber is in communication with the interior of the pipe. This assists with allowing pressure to be maintained on one side of the plug device prior to the inner plug being removed from the outer plug body.

Preferably, the inner plug has an outer circumferential recess to connect with the at least one port, or to connect the one or more bores at an outer circumference of the inner plug.

In embodiments, (i) the internal surface of the chamber is uncoated with the protective layer and/or (ii) only the internal surface of the inner plug is uncoated with the protective layer and all surfaces of the outer plug body are coated with the protective layer.

Preferably, the protective layer comprises a corrosion-inhibiting coating. Advantageously, this prevents any corrosion/dissolution from occurring until the initiation operation is performed by an operator.

In another embodiment, the degradation initiation operation comprises at least partially removing, in use, the protective layer at or near one end of the inner plug, thereby initiating corrosion or dissolution of the degradable material through contact with the fluid. Thus, in a vertically oriented pipe in a well, the upper part of the inner plug (nearest the surface) may be scraped or punctured by a remotely operated tool such as an abrasive member; and in this arrangement, further insurance is provided that no corrosion/dissolution occurs until the remotely operated tool is used.

Preferably, in use, after the inner plug has been removed from the outer plug body, the exposed regions of the outer plug body are in contact with the fluid, thereby initiating corrosion or dissolution of the outer plug body. An advantage is that both parts of the plug are dissolved, with a slight delay between commencement of corrosion or dissolution for each part. This can ensure plug removal while decreasing the chances of unwanted blocking downstream.

Preferably, the inner plug and/or the outer plug body are of magnesium.

The outer plug body may include an outer recess for receiving, in use, a portion of an anti-rotation ring disposed between the pipe and the outer plug body, to thereby prevent or inhibit rotation of the outer plug body within the pipe. Such an arrangement is may be useful in the event that the plug device fails to operate, and is required to be machined out of the pipework by milling.

The outer plug body may include at least two seal circumferential recesses, each of the two seal circumferential recesses being adapted for receiving, in use, a respective 'O' ring disposed between the pipe and the outer plug body, to thereby provide a seal between the outer plug body and the pipe. The two seal circumferential recesses may be disposed at axial positions on either side of the anti-rotation ring.

In embodiments, an outer portion of the outer plug body has an external profile corresponding in opposite shape to an internal seat profile on an internal bore of the pipe. Preferably, the external profile is substantially convex. The outer plug body may have a larger outer diameter than the internal bore of the pipe.

The shear device may comprise at least one split ring. Preferably the shear device comprises two split rings. The shear rings are springy and biased in a closed condition. The shear device may further comprise a continuous ring, such that the two split rings and the continuous ring are nested together. Such an arrangement provides a ready way for the shear ring to be operable.

Preferably the shear ring is at least partially within an outer circumferential recess of the inner plug and an internal recess of the outer plug body. Preferably the outer circumferential recess of the inner plug has an inclined opening, and each of the split rings have matching inclined surfaces which abut the inclined opening of the recess.

Preferably upon movement of the inner plug relative to the outer plug body the inclined surfaces engage one another to expand a diameter of at least one of the split rings to thereby break the continuous ring to release the inner plug from the outer plug body. Such an arrangement provides a ready way for movement of the inner plug to break the shear ring.

In one embodiment the outer plug body comprises two ring portions which abut each other and have a common axis. Preferably the two ring portions abut each other at the internal recess of the outer plug body. Such an arrangement assists with assembly of the plug device.

In one embodiment the outer plug body comprises a tube. Preferably one end of the tube is closed by the inner plug. Preferably another end of the tube is closed by an end cap. In one embodiment the end cap and the outer plug body comprise a single part.

Preferably the end cap is adapted to undergo, in use, a degradation initiation operation such that fluid is able to enter the chamber to initiate corrosion or dissolution of the end cap, the outer plug body, and/or the inner plug from inside the chamber.

Preferably the end cap and/or the inner plug is adapted to be removed from the outer plug body when the pressure of the fluid on one side of the end cap or the inner plug exceeds the first pressure threshold or when a force applied to the one side of the inner plug or the end cap exceeds the force threshold.

Preferably the inner plug is at one end of the tube. Preferably another end of the tube is closed by an end cap. Preferably the chamber comprises a ring-shaped space between the inner plug and the outer plug body.

In one embodiment the inner plug has a through-hole. Preferably the through-hole is in fluid communication with an inner space of the outer plug body. Preferably a mouth of the through-hole has a ball seat for location of a ball thereon to close the through-hole.

In one embodiment an outer surface of the degradable plug device comprises a slip assembly comprising one or more jaws and one or more sealing elements, the slip assembly for gripping, and sealing the degradable plug device within the pipe.

According to a second aspect of the invention, there is provided an apparatus for temporarily blocking flow of fluid through a pipe comprising a pipe defining a passage, the pipe having in the passage a degradable plug device according to any of claims 1 to 58 of the appended claims.

Such an apparatus provides the advantage that the flow of fluid in the pipe can readily be controlled such that upflow from a lower element in, for example, a well can be prevented until release of the plug through initiation of inner plug corrosion/dissolution under the control of an operator.

The apparatus may further include a shoulder in the pipe (for example mounted on the inner surface thereof). Preferably, after moving out of the first position the inner plug is retained on the shoulder of the pipe. This can advantageously ensure plug removal while decreasing the chances of unwanted blocking downstream.

In one embodiment, the apparatus comprises a plurality of pipe sections arranged and connected together, for example in a well. Preferably, a degradable plug device according to any of the claims 1 to 58 of the appended claims is arranged to be at an end of one or more pipe sections. In one embodiment, the apparatus further comprises a plurality of tubing anchors, at least one tubing anchor being disposed adjacent to a respective degradable plug.

In this way, the plug devices can be incorporated into the well as an integral part of the well completion, for example by having many plug devices along the pipework (i.e. the plug devices are introduced into the well with the pipework). A plug device would commonly be below a production packer (i.e. the tubing anchor) so that there are multiple zone completions that can be stimulated for hydrocarbon production, for example in fracturing operations. Once the completion is at the appropriate depth, the production packer is set (activated) by raising the pressure up against the plug device. Once the production packer is set and tested, the pressure on the well can be increased and the plug thereby "activated" (dissolution initiated) when required.

The apparatus may include an anti-rotation ring disposed between the pipe and the outer plug body, the anti-rotation ring being fixedly attached to the pipe and having a portion engaging, in use, an outer recess of the outer plug body, to thereby prevent or inhibit rotation of the outer plug body within the pipe. Preferably, an internal bore of the pipe has an internal location profile for locating, in use, the anti-rotation ring.

The apparatus may include at least two 'O' rings disposed between the pipe and the outer plug body, each 'O' ring being received, in use, in a respective one of the at least two seal circumferential recesses in the outer plug body, to thereby provide a seal between the outer plug body and the pipe. Preferably, two of the 'O' rings are disposed at different axial positions such that one is on either side of the anti-rotation ring.

In embodiments, an internal bore of the pipe has an internal seat profile for seating, in use, the outer plug body within the pipe. Preferably, the internal seat profile is between adjacent pipe sections of the pipe or at the junction thereof.

In embodiments, the internal bore of the pipe has a smaller diameter than an outer diameter of the outer plug body. Preferably, the internal seat profile comprises a recess. Preferably, the internal seat profile is substantially concave.

In use, the outer plug body may be unseated and freed from the internal seat profile by the application of fluid pressure in excess of a second pressure threshold that is different from the first pressure threshold. The second threshold may be between 1300 to 206800 kPa, and in one embodiment approximately 34500 kPa.

In embodiments, an internal bore of the pipe has an internal tool profile for locating, in use, tools to be used on the pipe.

According to a third aspect of the invention, there is provided a method of operating a degradable plug device for a pipe, the degradable plug device being in accordance with any of claims 1 to 58 of the appended claims, the method including: disposing the inner plug in at least a first position, in which the inner plug and/or the outer plug body prevents said fluid flow through the pipe; and performing a degradation initiation operation such that fluid is able to enter the chamber to initiate corrosion or dissolution of at least the inner plug from inside the chamber.

In one embodiment, performing said degradation initiation operation comprises moving the inner plug relative to the outer plug body between the first position and a second position, in which fluid is able to enter the chamber to initiate corrosion or dissolution of the inner plug from inside the chamber.

In one embodiment, moving the inner plug relative to the outer plug body comprises raising a pressure of the fluid on one side of the inner plug such that said pressure exceeds a first pressure threshold, to thereby move the inner plug out of the first position.

In another embodiment, moving the inner plug relative to the outer plug body comprises applying a force using an actuating member to one side of the inner plug such that the applied force exceeds a force threshold, to thereby move the inner plug out of the first position.

Preferably the outer plug body and the inner plug being connected to each other with a shear device, wherein raising the pressure of the fluid such that said pressure exceeds the first pressure threshold, or applying the force using the actuating member such that the applied force exceeds the force threshold causes the shear device to fail.

In one embodiment, the inner plug is released from the outer plug body upon failure of the shear device.

In another embodiment, the inner plug is moved a predetermined distance relative to the outer plug body upon failure of the shear device.

In the case of the above alternative characterisation, after release, or after movement by the predetermined distance, the inner plug is free of the outer plug body and resides within the outer plug body.

Preferably, in the second position, fluid is able to enter the chamber via the at least one port.

Preferably, sealing between the outer plug body and the inner plug is provided by 'O' ring seals. Said sealing may comprise a first 'O' ring seal axially disposed between the at least one port and a first side of the inner plug, and a second 'O' ring seal axially disposed between the at least one port and a second side of the inner plug, which is opposite the first side. Preferably, the predetermined distance comprises moving the at least one port from a position where it is disposed between 'O' ring seals, to a position where it is not disposed between 'O' ring seals, such that the chamber is in communication with the interior of the pipe. This assists with allowing pressure to be maintained on one side of the plug prior to the inner plug being removed from the outer plug body.

Preferably, the method further includes using a corrosion-inhibiting coating as the protective layer.

In another embodiment, said performing the degradation initiation operation comprises at least partially removing the protective layer at or near one end of the inner plug, thereby initiating corrosion or dissolution of the degradable material through contact with the fluid.

Preferably the method further includes initiating corrosion or dissolution of the outer plug body after the inner plug has been removed from the outer plug body due to the exposed regions of the outer plug body being in contact with the fluid.

Preferably, the method includes forming the inner plug and/or the outer plug body of magnesium.

Preferably an anti-rotation ring is disposed between the pipe and the outer plug body the method including locating a portion of the anti-rotation ring in the plug body to thereby prevent or inhibit rotation of the outer plug body within the pipe.

In embodiments, the outer plug body includes at least two seal circumferential recesses, and the method may include locating a respective 'O' ring disposed between the pipe and the plug body in each of the two seal circumferential recesses, to thereby provide a seal between the outer plug body and the pipe.

In one embodiment the method includes assembling the degradable plug within the pipe comprising:
 locating one ring portion of the outer plug body within one pipe section;
 locating the split rings and the continuous ring into the outer circumferential recess of the inner plug;
 inserting the inner plug within the one ring portion of the outer plug body so that the split rings and the continuous ring are at least partially within the inner recess of the outer plug body;
 locating another ring portion over the inner plug so that the two ring portions abut one another; and
 locating another pipe section over the plug device.

Preferably the method includes installing the degradable plug device into the pipe as the pipe is being inserted in a well.

In another embodiment the method includes:
 deploying the degradable plug device into a pre-installed pipe within a well; and
 operating the slip assembly to grip and seal the degradable plug device within the pipe.

Preferably the method further includes removing the end cap or the inner plug from the outer plug body so that well fluid is able to enter the chamber. Preferably the method further includes removing the end cap and the inner plug so that fluid is able to pass through the outer plug body.

In one embodiment the method further includes locating the ball on the ball seat, and applying pressure to one side of the inner plug to move it so that well fluid is able to enter the chamber.

The method may further include locating one or more degradable plugs into the pipe, and locating the pipe into a well. Preferably, the method further includes activating a plurality of degradable plugs at different times by performing the degradation initiation operation to initiate production from the well. Preferably, the method includes activating the plurality of degradable plugs along the length of the pipe in succession.

Such a method provides the advantage that the plug device can be made to dissolve quickly, for example, by controlling the position of the port and thereby the ingress of fluid into the chamber.

According to an alternative characterisation of the invention there is provided a degradable plug device for a pipe having an outer plug body with an inner plug, the outer plug body and the inner plug being of a degradable material, the plug device having a chamber, the outer plug body and the inner plug being connected to each other with a shear device, the exposed surfaces of the degradable plug device having a protective layer thereon to inhibit corrosion, wherein upon application of a threshold pressure or a force onto the inner plug the shear device fails permitting the inner plug to be moved relative to, or released from, the outer plug body to permit fluid to enter the chamber to initiate corrosion of the degradable plug device from inside the chamber, the plug device preventing fluid flow through the pipe until it has been degraded or the inner plug has been removed from the plug body.

According to another alternative characterisation of the invention them is provided a degradable plug device for a pipe having an outer plug body with an inner plug, the outer plug body and the inner plug being of a degradable material, the plug device having a chamber, the exposed surfaces of the degradable plug device having a protective layer thereon to inhibit corrosion, wherein the plug device is adapted to undergo, in use, a degradation initiation operation such that fluid is able to enter the chamber to initiate corrosion or dissolution of the inner plug from inside the chamber.

According to another aspect of the invention there is provide a method of operating a degradable plug device according to the alternative characterisations of the invention.

According to another aspect of the invention there is provide an apparatus for temporarily blocking flow of fluid through a pipe according to the alternative characterisations of the invention.

Any preferred or optional features of one aspect or characterisation of the invention may be a preferred or optional feature of other aspects or characterisations of the invention.

BRIEF DESCRIPTION OF THE DRAWINGS

Other features of the invention will be apparent from the following description of preferred embodiments shown by way of example only with reference to the accompanying drawings, in which;

FIGS. 4(a), 4(b) and 4(c) show a plug device according to a second embodiment;

FIGS. 5(a), 5(b) and 5(c) show a plug device according to a third embodiment;

FIGS. 9(a), 9(b), and 9(c) show a plug device according to another embodiment of the invention; and FIGS. 10(a), 10(b), and 10(c) show a plug device according to another embodiment of the invention.

DETAILED DESCRIPTION

Figure 2:
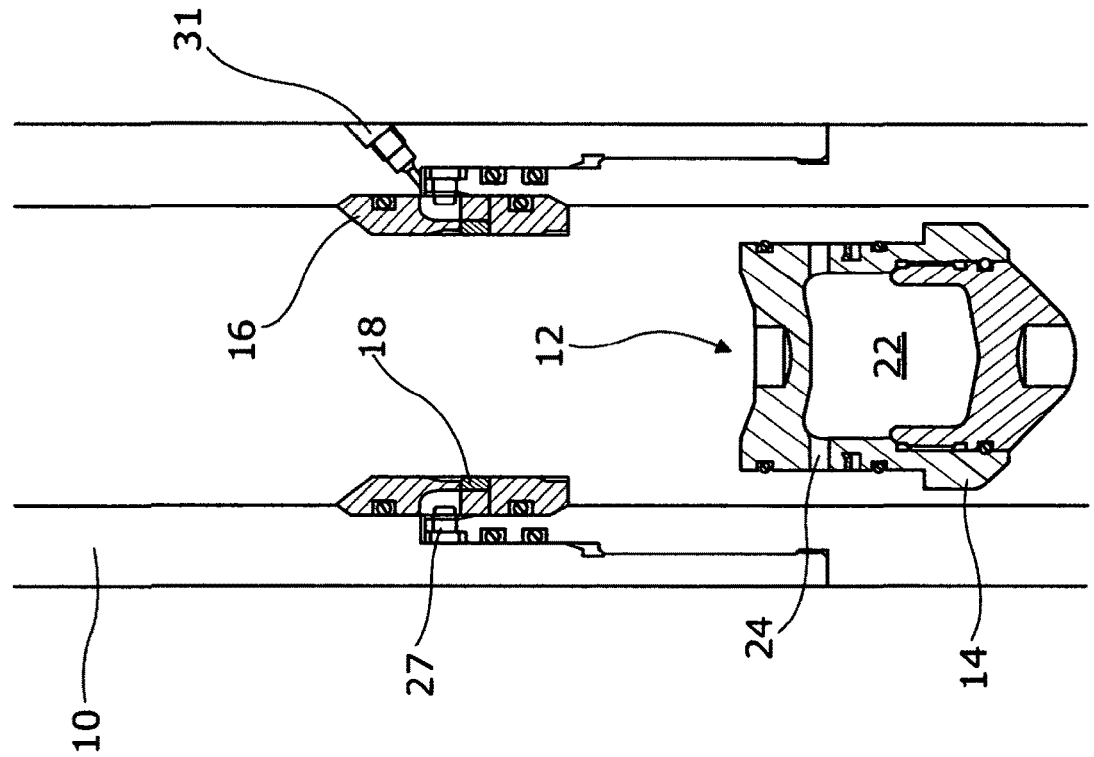
FIG. 2 shows a view of the apparatus shown in FIG. 1 with the plug device in an open condition.
Figure 1:
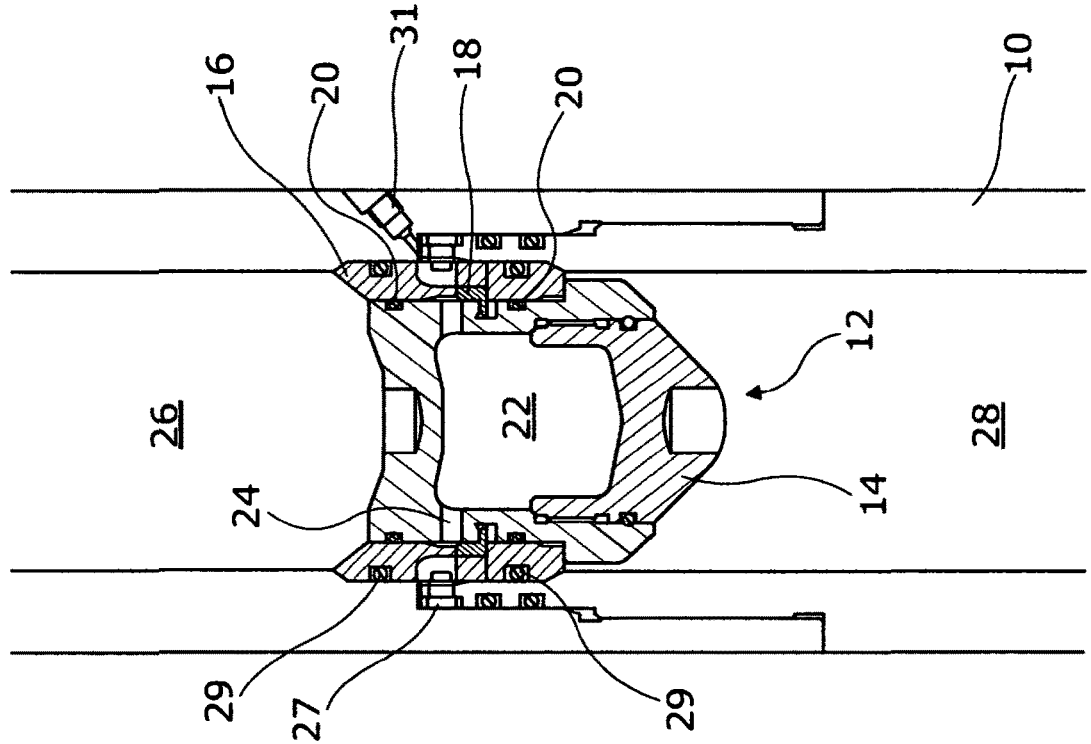
FIG. 1 shows a schematic cross section of a pipe with a plug device according to a first embodiment of the invention.

FIG. 1 shows a schematic cross section of a pipe 10 with a plug device 12 according to a first embodiment of the invention. FIG. 2 shows a view of the apparatus shown in FIG. 1 with the plug device 12 in an open condition. In FIG. 2 like features to the arrangements of FIG. 1 are shown with like reference numerals. In FIGS. 1 and 2 the pipe 10 is comprised of two parts and the plug device 12 is located in a region between the two parts. A typical length of the plug device 12 might be 10 cm. The plug device 12 comprises an inner plug 14, which is retained in a plug body 16 by a shear ring 18. The inner plug 14 is sealed to the plug body 16 with two 'O' rings 20 which are either side of the shear ring 18. The inner plug 14 has a chamber 22, which is accessible by well fluid via first ports 24 as described below with reference to FIG. 2. The inner plug 14 comprises two pieces which are sealed together to for the chamber 22 between the two pieces.

The plug device 12 is primarily made of magnesium or similar disintegrable material. When the plug device 12 is in situ in the pipe 10, as shown in FIG. 1, the surfaces of the plug device 12 that can come into contact with well fluid, i.e. in the regions above 26 and below 28 the plug device 12, have a coating (i.e. a protective layer) that is resistant to corrosion. The internal surfaces of the chamber 22 and the plug body 16 are uncoated so that they can be exposed to well fluid as described below with reference to FIG. 2.

"Degradable" is intended to mean that the inner plug 14 and/or plug body 16 is disintegrable, dissolvable, weakenable, corrodible, consumable, or otherwise removable. It is to be understood that use herein of the term "degrade", or any of its forms, incorporates the stated meaning. For example, the inner plug 14 and/or plug body 16 could be made from magnesium, aluminium, controlled electrolytic metallic materials, described in more detail below, etc. and degradable upon exposure to one or more fluids available or deliverable downhole, such as water, brine, acid, oil, etc. By exposing the inner plug 14 and/or plug body 16 core to a specified downhole fluid, the inner plug 14 can be removed without an intrusive, costly, or time-consuming operation such as milling.

Each of the inner plug 14 and the outer plug body 16 effectively comprise an inner core coated in a protective layer. Materials appropriate for the purpose of degradable cores include magnesium, aluminium, controlled electrolytic metallic materials, etc. The controlled electrolytic materials as described herein are lightweight, high strength metallic materials. Examples of suitable materials and their methods of manufacture are given in US2011/0135953. These lightweight, high-strength and selectably and controllably degradable materials include fully-dense, sintered powder compacts formed from coated powder materials that include various lightweight particle cores and core materials having various single layer and multilayer nanoscale coatings. These powder compacts are made from coated metallic powders that include various electrochemically-active (for example having relatively higher standard oxidation potentials) lightweight, high-strength particle cores and core materials, such as electrochemically active metals, that are dispersed within a cellular nanomatrix formed from the various nanoscale metallic coating layers of metallic coating materials, and are particularly useful in borehole applications. Suitable core materials include electrochemically active metals having a standard oxidation potential greater than or equal to that of Zn, including as Mg, Al, Mn or Zn or alloys or combinations thereof. For example, tertiary Mg—Al—X alloys may include, by weight, up to about 85% Mg, up to about 15% Al and up to about 5% X, where X is another material. The core material may also include a rare earth element such as Sc. Y, La, Ce, Pr, Nd or Er, or a combination of rare earth elements. In other embodiments, the materials could include other metals having a standard oxidation potential less than that of Zn. Also, suitable non-metallic materials include ceramics, glasses (for example, hollow glass microspheres), carbon, or a combination thereof. In one embodiment, the material has a substantially uniform average thickness between dispersed particles of about 50 nm to about 5000 nm. In one embodiment, the coating (protective) layers are formed from Al. Ni, W or Al2O3, or combinations thereof. In one embodiment, the coating is a multi-layer coating, for example, comprising a first Al layer, an Al2O3 layer, and a second Al layer. In some embodiments, the coating may have a thickness of about 25 nm to about 2500 nm.

These powder compacts provide an advantageous combination of mechanical strength properties, such as compression and shear strength, low density, and selectable and controllable corrosion properties, particularly rapid and controlled dissolution in various borehole fluids. The fluids may include any number of ionic fluids or highly polar fluids, such as those that contain various chlorides. Examples include fluids comprising potassium chloride (KCl), hydrochloric acid (HCl), calcium chloride (CaCl2), calcium bromide (CaBr,) or zinc bromide (ZnBr2). For example, the particle core and coating layers of these powders may be selected to provide sintered powder compacts suitable for use as high strength engineered materials having a compressive strength and shear strength comparable to various other engineered materials, including carbon, stainless and alloy steels, but which also have a low density comparable to various polymers, elastomers, low-density porous ceramics and composite materials.

During use of the plug device 12 as shown in FIG. 1, the 'O' rings 20 prevent the well fluid from entering the uncoated chamber 22 of the inner plug 14, or the uncoated surface of the plug body 16. When a predetermined hydraulic pressure is applied from above in the region 26, the shear ring 18 fails and the inner plug 14 is free to pass through the plug body 16, so that it is free to drop into the well as shown in FIG. 2. The well fluid can then contact the uncoated surfaces of the plug device 12, i.e. the internal surfaces of the chamber 22 and the uncoated surface of the plug body 16, so that corrosion and rapid dissolving thereof can begin. It will be appreciated that well fluid enters the chamber 22 via the first ports 24.

Returning to FIGS. 1 and 2, in this embodiment the inner plug 14 drops into the well. In an alternative arrangement, the inner plug 14 is retained on a shoulder (not shown) of the pipe 10 to prevent it dropping down the pipe 10 into the well. Such an arrangement is intended to allow the inner plug 14 to more fully dissolve in the well fluid that is present near to the initial location of the plug device 12, which may not be present at a deeper region of the well. When the inner plug 14 is removed or free from the outer plug body 16, the pipe 10 is open so that well fluid can pass through it. It can be seen most clearly form FIG. 2 that the outer plug body 16 is a ring that is inserted between two sections of the pipe 10, and the inner plug 14 is within the ring.

FIGS. 3(*a*) and 3(*b*) show alternative embodiments of an apparatus comprising a pipe 10 and plug devices 12 according to the embodiment of FIG. 1. According to embodiments, the plug device 12 can be run into a well as an integral part of the well completion, for example by having many plug devices 12 along the pipework (i.e. the plug devices are introduced into the well with the pipework). A plug device 12 would commonly be below a production packer (i.e. the tubing anchor) 30, so that there are multiple zone completions that can be stimulated for hydrocarbon production. Once the completion is at depth, the production packer 30 is set by pressuring up against the plug device 12. Once the production packer 30 is set and tested, pressure on the well can be increased, and the plug device 12 "activated" when required.

In the embodiments of FIGS. 3(*a*) and 3(*b*), the well pipe 10 is formed by successive pipe sections 10*a*, 10*b*, and 10*c*. For illustration, only three pipe sections 10*a*-10*c* are shown, and it will be appreciated by skilled persons that many more sections may be used.

In the embodiment of FIG. 3(*a*), respective plug devices 12*a* and 12*b* are positioned at lower ends 32*a* and 32*b* of pipe sections 10*a* and 10*b* of pipe 10. In addition, respective production packers 30*b* and 30*c* are provided at upper ends 34*b* and 34*c* of pipe sections 10*b* and 10*c*. Here, plug devices may be "activated" (dissolved/opened) in succession, for example, whereby plug device 12*b* is opened, enabling extraction via production packer 30*c*, and then later plug device 12*a* is opened, enabling extraction via production packer 30*b*.

In the embodiment of FIG. 3(*b*), respective plug devices 12*b* and 12*c* are positioned at upper ends 34*b* and 34*c* of pipe sections 10*b* and 10*c* of pipe 10. In addition, respective production packers 30*a* and 30*b* are provided at lower ends 32*a* and 32*b* of pipe sections 10*a* and 10*b*. Here, plug devices may be "activated" (dissolved/opened) in succession, for example, whereby plug device 12*c* is opened, enabling extraction via production packer 30*c* (not shown), and then later plug device 12*b* is opened, enabling extraction via production packer 30*b*.

Figure 3A:
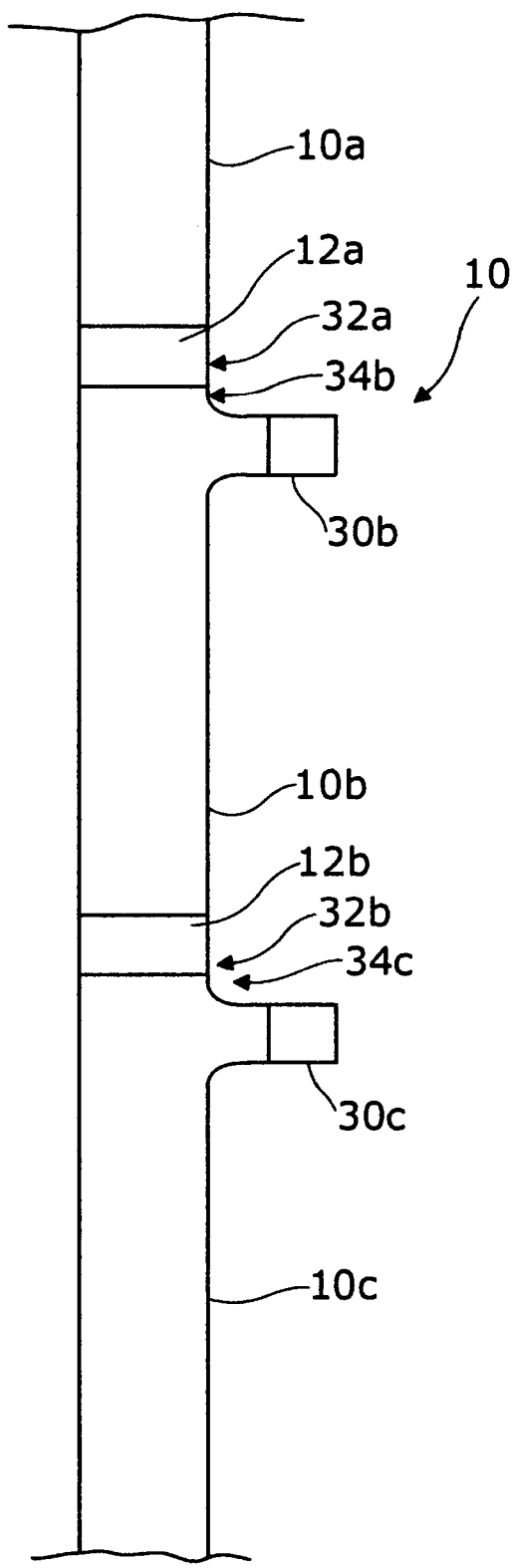
FIGS. 3(a) and 3(b) show alternative embodiments of an apparatus comprising a pipe and plug devices according to the embodiment of FIG. 1.
Figure 3B:
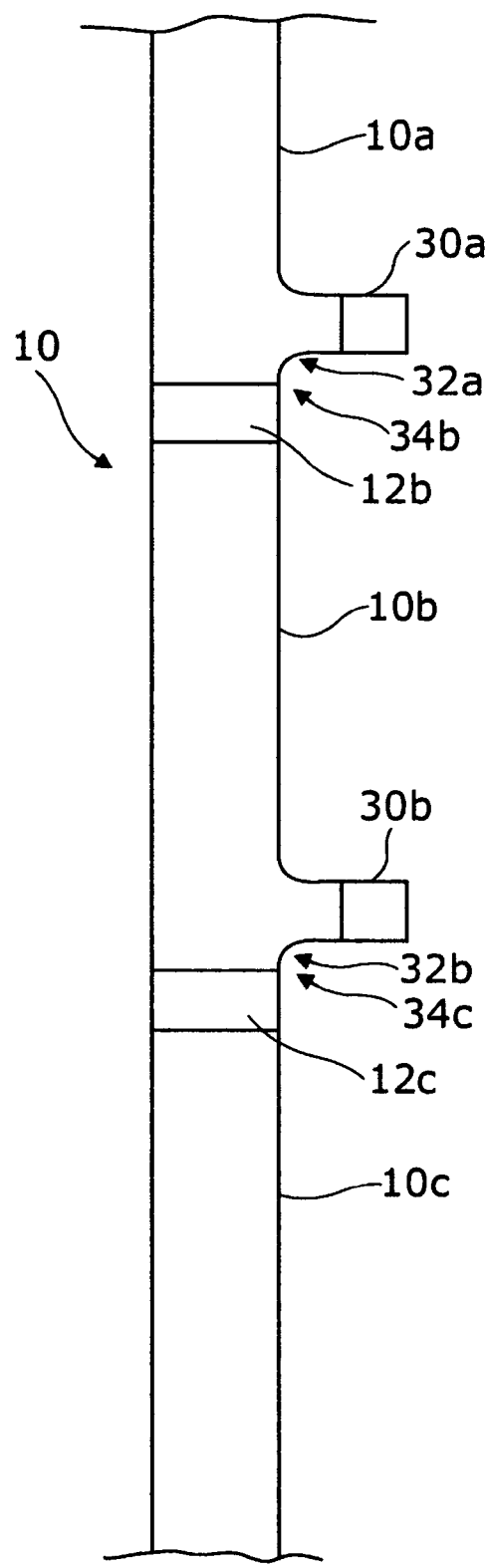

In either of the embodiments shown in FIG. 3*a* or 3*b* the pipe sections 10*a*, 10*b*, 10*c* may be filled with fluid (i.e. sea water) from the top (i.e. above the sea) as the pipe sections 10*a*, 10*b*, 10*c* are run into the well, or they may "self-fill" when the pipe sections 10*a*, 10*b*, 10*c* are in situ in the well.

FIGS. 4*a* and 4*b* also show a first port 31 in the pipe 10, which is in communication with the chamber 22 via a second port 33 in the plug body most clearly shown in FIG. 4*b*. The ports 31, 33 are used to perform pressure tests of the plug device 13 when in situ in the pipe 10 to ensure that the various parts thereof are seated correctly. A similar port 31 is shown in the embodiments of FIGS. 1 and 2 for the same purpose.

Also shown in FIG. 4*a* is an anti-rotation ring 27 between the pipe 10 and the plug body 16, which prevents the plug body 16 from rotation in the pipe 10. The anti-rotation ring 27 may be useful in the event that the plug device 13 fails to operate, and is required to be machined out of the pipe 10 by milling. Without the anti-rotation ring 27 the plug device 13 may rotate within the pipe 10 during milling thereby preventing or inhibiting unblocking of the pipe 10. FIGS. 4*a* and 4*b* also show that the plug body 16 is sealed to the pipe 10 with two 'O' rings 29 which are either side of the anti-rotation ring 27. Each 'O' ring 20, 29 is in a respective seal circumferential recess of the outer plug body or the inner plug 14. A similar anti-rotation ring 27 and two 'O' rings 29 are shown in the embodiment of FIGS. 0.1 and 2.

FIGS. 4*a* and 4*b* also show a first port 31 in the pipe 10, which is in communication with the chamber 22 via a second port 33 in the plug body most clearly shown in FIG. 4*b*. The ports 31, 32 are used to perform pressure tests of the plug device 13 when in situ in the pipe 10 to ensure that the various parts thereof are seated correctly. A similar port 31 is shown in the embodiments of FIGS. 1 and 2 for the same purpose.

FIG. 4(*b*) shows the plug device 13 after the predetermined pressure has been applied from above in the region 26 so that the inner plug 14 is free of the plug body 16. Well fluid then enters the chamber 22 via the radial bores 23 and also contacts the exposed surfaces of the plug body 16 to initiate the corrosion process as previously described. The inner plug 14 is then free to fall into the well under gravity. It will be appreciated that if the pipe 10 is horizontal the inner plug. 14 may reside in the pipe 10 near to the plug body 16.

FIG. 4(*c*) shows that when the plug body 16 has been removed by corrosion there is a first internal profile 35 (i.e. nipple profile) on an internal bore of the pipe 10. The internal profile 35 seats the plug body 16 within the pipe 10 between adjacent pipe sections 7, 9. The internal profile 35 can be used as a location point for other tools to perform further tasks after the inner plug 14 and the plug body 16 have been removed from the pipe 10.

These tasks might be for example, remedial work within the pipe such as additional milling or machining that may be required.

Also shown in FIG. 4(*c*) are two additional internal profiles 37, 39 (i.e. nipple profiles) on the internal bore of the pipe 10. Whereas the internal profile 39 is shown to be below where the plug device 13 is situated, in another arrangement the internal provide 39 may be above the plug device 13 to assist with remedial removal of the plug device 13 or other intervention operations that may be required. The internal profile 37 is a recess in which the anti-rotation ring 27 is located. The anti-rotation ring 27 is also located in an outer recess of the outer plug body 16. The internal profile 37 may alternatively be termed an internal location profile. The internal profile 39 is another location point below the plug device 13. The internal profile 39 may alternatively be termed an internal tool profile. Both internal profile 37, 39 can be used as location points for other tools to perform further tasks as required.

FIGS. 5(*a*), 5(*b*) and 5(*c*) show a plug device according to a third embodiment, generally designated 41. In FIGS. 5(*a*), 5(*b*) and 5(*c*) like features to the arrangements of FIGS. 1, 2, 4(*a*), 4(*b*) and 4(*c*) are shown with like reference numerals. In FIGS. 5(a), 5(b) and 5(c) the plug body 16 is a cup with the inner plug 14 being at a mouth of the cup such that the chamber 22 is formed between the inner plug 14 and the plug body 16. The inner plug 14 is retained in the plug body 16 with the shear ring 18 as shown in FIG. 5(a). In the embodiments of FIGS. 5(a) and 5(b) it will be appreciated that the chamber 22 is formed between the inner plug 14 and the plug body 16.

In the embodiment of FIGS. 5(a) and 5(b) the inner plug 14 and the plug body 16 are solid and of magnesium or similar disintegrable material. The internal surfaces of the chamber 22 may be uncoated. In one arrangement only the internal surface of the inner plug 14 is uncoated with all surfaces of the plug body 16 being coated. Such an arrangement for the chamber 22 is a convenient way to form the chamber 22 and avoids additional machining of the plug device 41. In FIG. 5(b) it will be appreciated that whereas the fluid is able to enter the chamber 22 to initiate corrosion or dissolution from inside the chamber 22, it will be understood that the chamber 22 may no longer be present as such, and the well fluid merely contacts the uncoated surfaces that comprised the chamber 22.

FIG. 5(b) shows the plug device 41 after the predetermined pressure has been applied from above in the region 26 so that the shear ring 18 fails and the inner plug 14 is free of the plug body 16 and resides within the cup of the plug body 16. In the position shown in FIG. 5(b) the inner plug 14 has been moved by about 1.5 cm, but it will be appreciated that the inner plug 14 may move by a different amount, such as between 0.5 to 2 cm, or 0.5 to 1.5 cm, or 1.0 to 1.5 cm. Well fluid then contacts the uncoated surfaces of the chamber 22 that was formed between the inner plug 14 and the plug body 16 to initiate the corrosion process as previously described. With such an arrangement the inner plug 14 is retained in the plug body 16 so that it does not fall into the well under gravity. Furthermore, the inner plug 14 is maintained in the region of the well where well fluid (i.e. brine) is present to initiate corrosion. Such an arrangement allows the inner plug 14 to more fully dissolve in the well fluid that is present near to the initial location of the plug device 12, which may not be present at a deeper region of the well.

The arrangements of FIGS. 5(a) and 5(b) allow a pressure seal to be maintained from below in the region 28 whilst the inner plug 14 is dissolved over a period of typically two to three days, although a longer or a shorter period is also envisaged. This allows pressure to be applied from above in the region 26, or from below in the region 28, to perform tasks within the well for a few days before over-pressuring in the region 26 to push the inner plug 14 and the plug body 16 out of the pipe as shown in FIG. 5(c). In one arrangement the pressure required to push the inner plug 14 into the position shown in FIG. 5(b) might be 4500 PSI (approx. 31000 kPa), and the pressure required to push the inner plug 14 and the plug body 16 out of the pipe 10 might be 5000 PSI (approx. 34500 kPa). In another arrangement the pressure required to push the inner plug 14 into the position shown in FIG. 5(b) might be between 200 to 30000 PSI (approx. 1300 to 206800 kPa). It will be understood that such pressure are for a particular temperature rating, such as up to 250° C. in these embodiments. The pressure required will typically depend on well conditions and the particular application required. The arrangements of FIGS. 5(a), 5(b) and 5(c) allow further options for operations and tasks within the well for example, performing pressure testing of the pipework or setting the production packer as required.

FIG. 5(c) shows the internal profiles 35, 37 (i.e. nipple profile) on the internal bore of the pipe 10 when the plug body 16 has been removed by applying pressure to the region 26, which can be used as location points for other tools to perform further tasks as required.

It can be seen from FIGS. 4(c) and 5(c) that the internal profile 35 has a shape that corresponds to an outer shape of the plug body 16. The plug body 16 is substantially convex. The internal profile 35 may alternatively be an internal seat profile.

It will be appreciated that the plug devices 12, 13, 41, shown in FIGS. 1, 2, 4, and 5 are required to be fitted between two adjacent pipe sections 7, 9 because the plug body 16 has a larger diameter than the internal bore of the pipe 10. Accordingly, the plug body 16 is located in a recess in the internal bore of the pipe such as provided by the internal profile 35. Without such a recess the plug body 16 would not be able to be fitted in the pipe 10.

The embodiments of FIGS. 1, 2, 4 and 5 show that the inner plug 14 can be either pushed out of the plug body 16, or retained within the plug body 16 as required by a particular application in a well.

In the embodiments described above, the inner plug 14 is separated from the plug body 16 by applying hydraulic pressure in the region 26. In an alternative arrangement, the inner plug 14 is separated from the plug body 16 by inserting a hammer or rod into the well, so that it pushes the inner plug 14 and breaks the shear ring 18, and that inner plug 14 is separated from the plug body 16. In another alternative arrangement, the protective coating of an upper part of the inner plug 14 may be scraped or punctured, so that the brine in the region 26 comes into contact with the magnesium and starts the corrosion process. Such an arrangement may provide additional advantages and uses for the plug device 12, 13, 41.

It will be appreciated that if the plug device 12, 13, 41 was entirely made of uncoated magnesium, it would start to corrode immediately on contact with well fluid. Through the use of the coatings on the various parts of the plug device 12, 13, 41 it is possible to prevent corrosion of the magnesium alloy, and to provide a more controlled corrosion and operation of the plug device 12, 13, 41.

The above embodiments of the plug device 12, 13, 41 provides the advantage that the unblocking of the pipe 10 can be more readily controlled. The plug device 12, 13, 41 provides a more positive way to control the unblocking of a pipe 10, and in effect operates as a valve device to open part of the well. The plug device 12, 13, 41 may alternatively be termed a valve device or a barrier device. It is envisaged that with the embodiments of the invention the plug device 12, 13, 41 may be in situ in the well for a period of 2 to 3 years, and possibly up to 10 years, before being activated to release the inner plug 14 from the plug body 16. It will be appreciated that after activation the time taken to degrade the inner plug 14 and plug body 16 may depend on the material thickness, fluid type and temperature etc.

Figure 6:
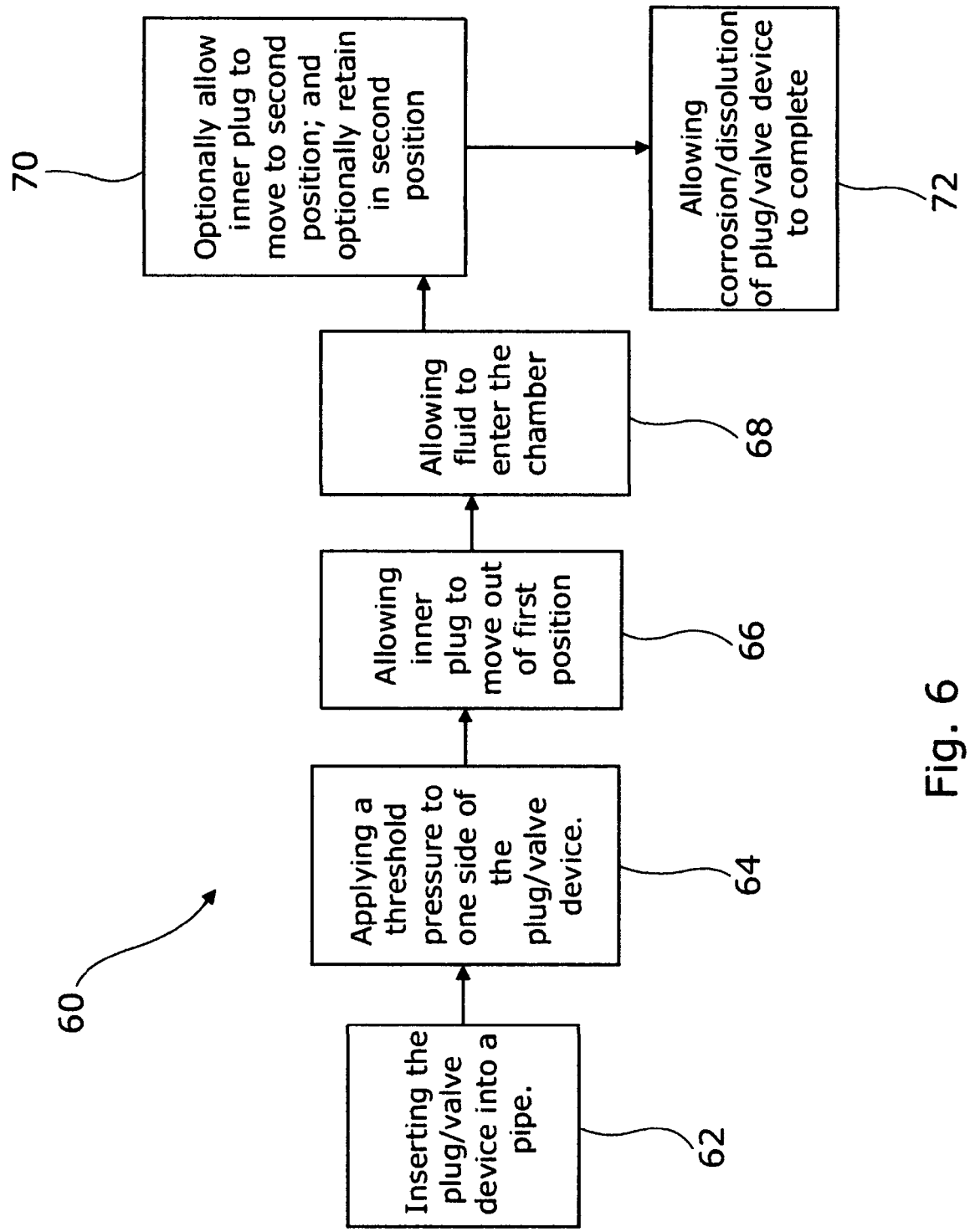
FIG. 6 shows steps of a method according to an embodiment of the invention.

FIG. 6 shows steps of a method according to an embodiment of the invention, generally designated 60. It will be appreciated that the steps may be performed in a different order, and may not necessarily be performed in the order shown in FIG. 6. In FIG. 6, step 62 shows inserting the plug device 12, 13, 41 into a pipe 10. Thereafter, at step 64, force or pressure is applied to one side of the plug device 12, 13, 41, and assuming this is above the threshold force or pressure required, it will cause release of the inner plug 14 (FIG. 2) from the first (pipe blocking) position (FIG. 1). This is followed (step 66) by allowing inner plug to move out of first position. Consequently, inner plug 14 is moved so that port 24 (FIG. 2) is now in communication with the interior of the pipe 10, whereby fluid is allowed (step 68) to enter chamber 22 (FIG. 2).

Optionally, thereafter, the inner plug 14 is allowed (step 70) to move to second position; and optionally the inner plug 14 is retained in the second position (FIG. 2). Finally, corrosion/dissolution of plug device 12, 13, 41 is allowed to complete (step 70). It will be appreciated that the plug device 12, 13, 42 prevents fluid flow through the pipe until it has been degraded or the inner plug 14 has been removed from the outer plug body 16.

In FIGS. 2 and 4b the inner plug 14 can be adapted, upon failure of the shear ring 18, to move a predetermined distance relative to the plug body 16, and optionally retained on a shoulder (not shown) of the pipe 10 to prevent it dropping down the pipe 10 into the well. In embodiments the predetermined distance may between 0.5 to 2 cm, or 0.5 to 1.5 cm, or 1.0 to 1.5 cm, or 5 to 25 cm.

In the above embodiments reference is made to the shear ring 18. It will be understood that other arrangements may be used to connect the plug body 16 and the inner plug 14 together such as a shear pin or a shear sleeve. Such arrangements may be termed a shear device. The shear device may be made of the degradable material or a non-degradable material, which ensures that the shear device can be dissolved when required.

Figures 7A, 7B, 7C:
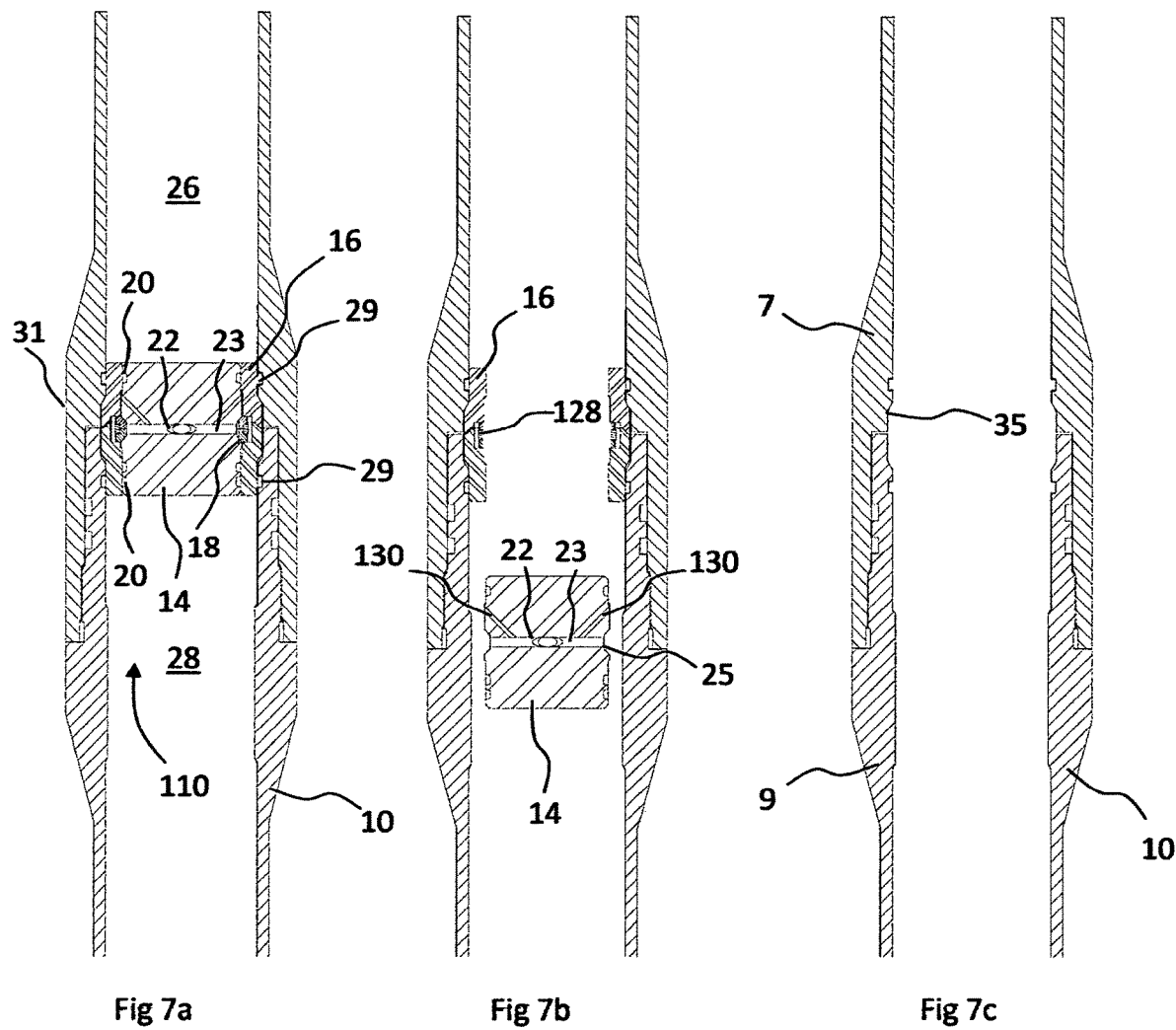
FIGS. 7(a), 7(b) and 7(c) show a plug device according to an embodiment of the invention.
Figure 8:
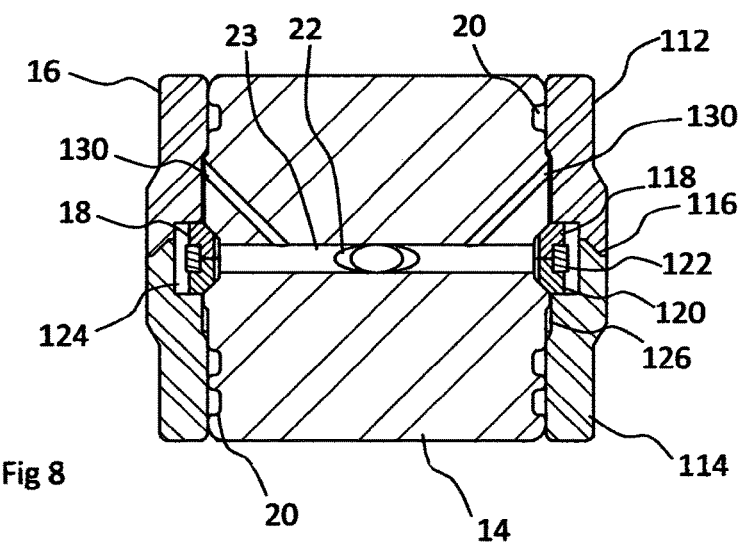
FIG. 8 shows an enlarged view of the plug device of FIG. 7.

FIGS. 7(a), 7(b) and 7(c) show a plug device according to another embodiment, generally designated 110. FIG. 8 shows an enlarged view of the plug device 110 of FIG. 8. The embodiment of FIGS. 7 and 8 is similar to the embodiment of FIGS. 4(a), 4(b) and 4(c) but with certain differing features as mentioned below. Like features to the arrangements of FIGS. 1, 2, 4(a), 4(b) and 4(c) are shown with like reference numerals. In FIGS. 7 and 8 the plug body 16 is shown to comprise a first portion 112 and a second portion 114 to assist with assembly of the plug device 110. The first and second portions 112, 114 of the plug body 16 are two rings that abut each other as shown at 116. The first and second portions 112, 114 have a common axis and are adjacent to one another on the common axis so that the wall of the plug body 16 is continuous. In other words, the common axis is a common axis of rotation, and the continuous plug body 16 comprises a wall of the first and second portions 112, 114. An external surface of the first and second portions 112, 114 nests within the internal profile 35 of the pipe which seats the plug body 16 in the pipe 10 between adjacent pipe sections 7, 9. The first and second portions 112, 114 may be termed ring portions.

FIG. 8 also shows that the shear ring 18 comprises three parts, which are two split rings 118, 120 and one continuous ring 122 to assist with assembly of the plug device 110, and to provide the required shearability of the shear ring 18. Each of the split rings 118, 120 have a small gap at some location along their circumference so that they have a degree of resilience or springiness in the plane of each split ring 118, 120. In other words, each of the split rings 118, 120 has an expandable diameter (i.e. circumference) so that they are springy. The split rings 118, 120 and the continuous ring 122 are nested together in the outer circumferential recess 25 of the inner plug 14 and in an internal recess 124 of the plug body 16. The outer circumferential recess 25 of the inner plug 14 has an inclined opening such that it is flared or chamfered outwards, and each of the split rings 118, 120 have a matching inclined surface which abuts the inclined opening of the recess 25.

In operation the inner plug 14 is pushed downwards relative to the plug body 16, for example by applying an increased pressure from above in the region 26. As the inner plug moves downwards the inclined surfaces of the recess 25 and the split ring 118 engage each other and expand the diameter (i.e. circumference) of the split ring 118. The split ring 118 then acts on the continuous ring 122 and breaks it so that the inner plug 14 is then able to travel downwards so that it is free of the plug body 6 as shown in FIG. 7(b). In FIG. 8 a space 126 is shown between the plug body 16 and the inner plug 14, which readily permits the inner plug 14 to move relative to the plug body 16 when the split ring 118 is being expanded. Also shown in FIG. 7(b) are the remains 128 of the shear ring 18 within the internal recess 124 of the plug body 16.

FIG. 8 also shows that the chamber 22 of the inner plug 14 comprising one or more radial bores 23 that intersect each other at the centre of the inner plug 14 to form the chamber 22 in a similar manner to the arrangement of FIGS. 4a), 4(b) and 4(c). The one or more radial bores may be termed one or more ports. In FIG. 8 the inner plug 14 also has two inclined channels 130 which provide additional fluid communication between the chamber 22 and the exterior of the inner plug 14 as shown in FIG. 7(b).

In a similar manner to the previous embodiments, the plug device 110 is made of a degradable material and the exposed surfaces of the plug device 110 that are in contact with well fluid as shown in FIG. 7(a) are coated so that they are protected from the corrosive effect of the well fluid. The internal surfaces of the plug device 110 are uncoated such that when the plug device 110 has been activated as shown in FIG. 7(b) the well fluid enters the chamber 22 via the ports/radial bores 23 and the channels 130. The well fluid contacts the unprotected surfaces of the plug device 110 (i.e. the internal surface of the plug body 16, the inner plug 14, the shear ring 18) to initiate the corrosion process as previously described. The inner plug 14 is then free to fall into the well under gravity. It will be appreciated that if the pipe 10 is horizontal the inner plug 14 may reside in the pipe 10 near to the plug body 16.

The embodiment of FIGS. 7 and 8 can be readily assembled such that the portion 114 of the plug body 16 is first located into the pipe section 9. The split ring 120 is then expanded and located in the outer circumferential recess 25 of the inner plug 14. The continuous ring 122 is then nested with the split ring 120, and the split ring 118 is expanded and nested with the continuous ring 122 in the recess 25. The inner plug 14 with the assembled shear ring 18 on it is then inserted into the portion 114 so that the shear ring 18 is within the internal recess 124 of the plug body 16. The portion 112 of the plug body 16 is then located over the inner plug 14, and then the pipe section 7 is located over the portion 112.

It will be appreciated that whereas the embodiment of FIGS. 7 and 8 does not have an anti-rotation ring 27 between the pipe 10 and the plug body 16, such an arrangement could be readily provided if required in a similar manner to the embodiments of FIGS. 4 and 5 to prevent the plug body 16 of the embodiment of FIGS. 7 and 8 from rotation in the pipe 10.

The method of operating the plug device 110 of FIGS. 7 and 8 includes assembling the degradable plug 110 within the pipe 10 comprising locating one ring portion 114 of the outer plug body 16 within one pipe section 9, locating the split rings 118, 120 and the continuous ring 122 into the outer circumferential recess 25 of the inner plug 14, inserting the inner plug 14 within the one ring portion 114 of the outer plug body 13 so that the split rings 118, 120 and the continuous ring 122 are at least partially within the inner recess 124 of the outer plug body 16, locating another ring portion 112 over the inner plug 14 so that the two ring portions 112, 114 abut one another, and locating another pipe section 7 over the plug device 14. The method further includes installing the degradable plug device 110 into the pipe 10 as the pipe 10 is being inserted in a well.

FIGS. 9(a), 9(b); and 9(c) show a plug device according to another embodiment, generally designated 140. The embodiment of FIGS. 9(a), 9(b), and 9(c) is similar to the embodiment of FIGS. 5(a), 5(b) and 5(c) but with certain differing features as mentioned below. Like features to the arrangements of FIGS. 1, 2, 4, 5, 7 and 8 are shown with like reference numerals. In FIG. 9 the plug body 16 of the plug device 140 is shown to be tubular. In the embodiment shown the plug body 16 has an outside diameter of about 2.5 cm, but much larger outside diameters are envisaged to take account of a particular well. One end of the plug body 16 is closed by the inner plug 14. The other end of the plug body 16 is closed by another inner plug 142, which may be alternately termed an end cap. In one arrangement the plug body 16 and the end cap 142 are one piece, i.e. the plug body 16 and the end cap 142 are a single part. In another arrangement the plug body 16 and the end cap 142 are two pieces as shown in FIG. 9. In another arrangement the plug body 16 and the inner plug 14 are one piece, i.e. the plug body 16 and the inner plug 14 are a single part. In another arrangement the plug body 16 and the inner plug 14 are two pieces as shown in FIG. 9. In the embodiment of FIG. 9 the inner plug 14 may alternatively be termed an end cap. The chamber 22 comprises the internal space of the tubular plug body 16 which is closed by the inner plug 14 and the end cap 142 as shown in FIG. 9(a). An outer surface of the plug body 16 has a slip assembly 143, which comprises one or more jaws 144, one or more chamfered collars 146, a sealing ring 148, and a lock device 150. The sealing ring 148 may be of a rubberised material. The slip assembly 143 is activated by the lock device 150, which is a ring that is movable on an outer surface of the plug body 16. The slip assembly 143 is a known device and may alternatively be called an activation device or a grip device. When the lock device 150 is activated the slip assembly 143 is compressed and the chamfered collars 146 move on the outer surface of the plug body 16 and the jaws 144 move radially outwards as shown in FIG. 9(b). When the lock ring 150 is activated the sealing ring 148 is also compressed and expands radially outwards as shown in FIG. 9(b). Whereas only one slip assembly 143 is shown in another embodiment more than one slip assembly 143 may be provided. When there is more than one slip assembly 143, more than one sealing ring 148 and/or lock device 150 may be provided. The slip assembly 143 operates to secure and seal the plug device 140 within pipework, and may be alternatively termed a griping and sealing device. Also shown in FIG. 9 is a shear ring or pin 145 between the lock device 150 and the body 16. A shear ring or pin 145 is also shown between each chamfered collar 146 and the body 16. Upon movement of the lock ring 150 the three shear rings 145 break or rupture to permit the plug device 140 to move to the position shown in FIG. 9(b).

It will be appreciated that FIG. 9(a) shows the plug device 140 in a condition prior to activation, and FIGS. 9(b) and 9(c) show the plug device 140 with the slip assembly 143 in an activated condition. Furthermore, FIG. 9(b) shows the plug device 140 with the end cap 142 removed so that well fluid can enter as shown by arrows 151 to contact the internal surface of the chamber 22, and FIG. 9(c) shows the plug device 140 with the end cap 142 and the inner plug 14 removed so that well fluid can pass through the outer plug body 16.

In the embodiment of FIG. 9 the inner plug 14, the plug body 16, the end cap 142, the jaws 144, the chamfered collars 146 and the lock device 150 are of magnesium or similar disintegrable material, which may be coated on surfaces which do not form the chamber 22. In one embodiment the components of the slip assembly 143 may be of high carbon steel. The internal surfaces of the chamber 22 are uncoated. In FIGS. 9(b) and 9(c) it will be appreciated that well fluid is able to enter the chamber 22 to initiate corrosion or dissolution from inside the chamber 22 because the well fluid contacts the uncoated surfaces that comprise the chamber 22. The sealing ring 148 is typically not dissolvable. It will be understood that the chamber 22 can be flooded from below or above within the pipework to start the degradation depending on which way up the plug device 140 is located within the pipework. Also shown in FIG. 9 is a shear pin 141 connecting the end cap 142 with the body 16.

The plug device 140 can be deployed into a well from the surface, for example, running the plug device 140 in the completion/casing string or deployed into the well afterwards using known techniques such as on a wireline, slickline, jointed pipe or coil tubing, or deployed in a drill pipe, or dropped into the well from the surface. Accordingly, the plug device 140 does not need to be installed into the pipework beforehand. The plug device 140 is bi-directional in that it can be run into the well from above or below (i.e. top down or bottom up) depending on the setup of the well. FIG. 9(a) shows the plug device 140 before being deployed into the well and in a run position when being inserted into the well. As shown in FIG. 9(a) the chamber 22 is sealed before the plug device 140 is deployed into a well such that the chamber is dry. Once in the required position within the well (i.e. the required depth within the well) the slip device 143 of plug device 140 can be activated by operation of the lock device 150 as shown in FIG. 9(b) so that the jaws 144 bite into a wall of pipework within the well to inhibit the plug device 140 from moving up or down the pipework. In such a condition the sealing ring 148 is compressed so that it expands a diameter (i.e. circumference) thereof and makes a seal with the pipework so that pressure can be held above and/or below the plug device 140.

During the setting process of the plug device 140 a degradation initiation operation may be performed so that well fluid enters the chamber 22. Such an operation may include dropping a ball from the surface to move a sealed sleeve/piston, or dropping a rod or bar (or dissolvable material) into the well from the surface to break or remove the end cap 142 or the inner plug 14, or electronic activation, or applying pressure from the surface to move a sleeve/piston to burst the end cap 142 or rupture a part of the plug device 140 to allow fluid to enter the chamber 22. In another arrangement a setting device within the well is operated to grip the end cap 142 and break the shear pin 141 as shown in FIG. 9(b). In another arrangement, the protective coating of the end cap 142 or the plug body 16 may be scraped or punctured, so that the well fluid comes into contact with the magnesium and starts the corrosion process. In such a manner the plug device 140 can be activated from above or below within the well depending on how the plug device 140 is set up, i.e. depending on which way up the plug device 140 is located within the pipework. The pressure required to activate the plug device 140 (i.e. to remove one or both of the end cap 142 or the inner plug 14) can be adjusted according to the requirements from a very low pressure such as 1 PSI (6.9 kPa) and above to any well requirement to take account of the temperature and conditions within the well.

FIG. 9(b) shows the plug device 140 after the end cap 142 has been removed or ruptured as described above. Well fluid then contacts the uncoated surfaces of the chamber 22 to initiate the corrosion process as previously described. FIG. 9(c) shows the plug device 140 after the inner plug 14 has also been removed or ruptured as described above, for example by applying the predetermined pressure from above so that the inner plug 14 is pushed out of the plug body 16 so that it is free to fall into the well.

The arrangements of FIG. 9(b) allow a pressure seal to be maintained from below whilst the plug device 140 is dissolved over a period of typically two to three days, although a longer or a shorter period is also envisaged such as weeks or years depending the application. This allows pressure to be applied from above or from below the plug device 140 so that tasks within the well can be performed for a few days before over-pressuring in the region above the plug device 140 to push the inner plug 14 out of the pipe as shown in FIG. 9(c). In one arrangement the pressure required to push the inner plug 14 out of the plug body 16 might be 5000 PSI (approx. 34500 kPa). It will be understood that such a pressure is for a particular temperature rating, such as up to 250° C. in these embodiments. The pressure required will typically depend on well conditions and the particular application required. The arrangements of FIG. 9 allow further options for operations and tasks within the well, for example, performing pressure testing of the pipework. It is envisaged that the plug device 140 of FIG. 9 would be useful plug and abandonment operations, but other uses for the plug device 140 are also envisaged.

It will be appreciated that in a similar manner to the previous embodiments, the plug device 140 is made of a degradable material and the surfaces of the plug device 140 that are in contact with well fluid (i.e. in the condition shown in FIGS. 9(a)) are coated so that they are protected from the corrosive effect of the well fluid. The internal surfaces of the chamber 22 are uncoated such that when the plug device 140 has been activated (as shown in FIGS. 9(b) and 9(c)) the well fluid enters the chamber 22 to contact the exposed surfaces of the plug device 140 (i.e. the plug body 16, the inner plug 14) to initiate the corrosion process as previously described. Once pushed out of the plug body the inner plug 14 is then free to fall into the well under gravity, or reside near to the plug device 140 if the well is horizontal. If the plug device 110, 140 was entirely made of uncoated magnesium, it would start to corrode immediately on contact with well fluid, but through the use of the coatings on the various parts of the plug device 110, 140 it is possible to prevent or inhibit corrosion of the magnesium alloy, and to provide a more controlled corrosion and operation of the plug device 110, 140.

The method of operating the plug device 140 of FIG. 9 includes deploying the plug device 140 into a pre-installed pipe 10 within a well, and operating the slip assembly 143 to grip and seal the plug device 140 within the pipe 10. The method further includes removing the end cap 142 or the inner plug 14 from the outer plug body 16 so that well fluid is able to enter the chamber 22. The method includes removing the end cap 142 and the inner plug 14 so that fluid is able to pass through the outer plug body 16.

FIGS. 10(a), 10(b), and 10(c) show a plug device according to another embodiment, generally designated 160. The embodiment of FIGS. 10(a), 10(b), and 10(c) is similar to the embodiment of FIGS. 5 and 9 but with certain differing features as mentioned below. Like features to the arrangements of FIGS. 1, 2, 4, 5, 7, 8 and 9 are shown with like reference numerals. In FIG. 10 the plug body 16 of the plug device 160 is shown to be tubular. In the embodiment shown the plug body 16 has an outside diameter of about 2.5 cm, but much larger outside diameters are envisaged to take account of a particular well. One end of the plug body 16 is closed by the inner plug 14. The other end of the plug body 16 has another inner plug 162, which may be alternately termed an end cap. In one arrangement the plug body 16 and the inner plug 162 are one piece, i.e. the plug body 16 and the inner plug 162 are a single part. In another arrangement the plug body 16 and the end cap 142 are two pieces as shown in FIG. 10. The inner plug 162 has a through-hole 163, which may be termed a channel or a port. In another arrangement the plug body 16 and the inner plug 14 are one piece, i.e. the plug body 16 and the inner plug 14 are a single part. In another arrangement the plug body 16 and the inner plug 14 are two pieces as shown in FIG. 10. The through-hole 163 is in communication with a central space 166 of the plug device 160. The central space 166 may be termed an inner space. The internal bore of the through-hole 163 has a coating to inhibit corrosion. The inner plug 162 is in sealing contact with the plug body 16 such that a ring-shaped chamber 22 is formed between the inner plug 162 and the plug body 16. An opening or mouth of the through-hole 163 has a ball seat 167 for location of a ball 168 thereon as shown in FIG. 10(b). In the embodiment of FIG. 10 the inner plug 14 may alternatively be termed an end cap. The chamber 22 comprises the internal space between the tubular plug body 16 and the inner plug 162 as shown in FIG. 10(a). An outer surface of the plug body 16 has a slip assembly 143 as previously described with reference to FIG. 9, which is activated by the lock device 150. In FIG. 10, whereas only one slip assembly 143 is shown in another embodiment more than one slip assembly 143 may be provided. When there is more than one slip assembly 143, more than one sealing ring 148 and/or lock device 150 may be provided. The slip assembly 143 operates to secure and seal the plug device 160 within pipework, and may be alternatively termed a griping and sealing device. Also shown in FIG. 10 is another shear ring or pin 164 between the inner plug 162 and the body 16. Upon movement of the inner plug 162 by the ball 168 the shear ring 164 breaks or ruptures to permit the inner plug 162 to move to the position shown in FIG. 10(b).

It will be appreciated that FIG. 10(a) shows the plug device 160 in a condition prior to activation, and FIGS. 10(b) and 10(c) show the plug device 160 with the slip assembly 143 in an activated condition. Furthermore, FIG. 10(b) shows the plug device 160 with the inner plug 162 in an activated condition after the ball 168 has moved it so that well fluid can contact the internal surface of the chamber 22 (as shown by arrows 161), and FIG. 10(c) shows the plug device 160 with the inner plug 162 and the inner plug 14 removed so that well fluid can pass through the outer plug body 16.

In the embodiment of FIG. 10 the inner plug 14, the plug body 16, the inner plug 162, the jaws 144, the chamfered collars 146 and the lock device 150 are of magnesium or similar disintegrable material, which may be coated on surfaces which do not form the chamber 22. In one embodiment the components of the slip assembly 143 may be of high carbon steel. The internal surfaces of the chamber 22 are uncoated. In FIGS. 10(b) and 10(c) it will be appreciated that well fluid is able to enter the chamber 22 to initiate corrosion or dissolution from inside the chamber 22 because the well fluid contacts the uncoated surfaces that comprise the chamber 22. It will be understood that the chamber 22 can be flooded from below or above within the pipework to start the degradation depending on which way up the plug device 160 is located within the pipework.

The plug device 160 can be deployed into a well from the surface, for example, running the plug device 160 in the completion/casing string or deployed into the well afterwards using known techniques such as on a wireline, slickline, jointed pipe or coil tubing, or deployed in a drill pipe, or dropped into the well from the surface. Accordingly, the plug device 160 does not need to be installed into the pipework beforehand. The plug device 160 is bi-directional in that it can be run into the well from above or below (i.e. top down or bottom up) depending on the setup of the well. FIG. 10(a) shows the plug device 140 before being deployed into the well and in a run position when being inserted into the well. As shown in FIG. 10(a) the chamber 22 is sealed before the plug device 140 is deployed into a well such that the chamber 22 is dry. However, the central space 166 is open to well fluid (via the through-hole 163) and is coated to inhibit corrosion as described herein. The central space 166 may be initially full of air or well fluid, and may assist with buoyancy or balance of the plug device 160. Once in the required position within the well (i.e. the required depth within the well) the slip device 143 of plug device 160 can be activated by operation of the lock device 150 as shown in FIG. 10(b) so that the jaws 144 bite into a wall of pipework within the well to inhibit the plug device 160 from moving up or down the pipework. In such a condition the sealing ring 148 is compressed so that it expands a diameter (i.e. circumference) thereof and makes a seal with the pipework so that pressure can be held above and/or below the plug device 160. The ball 168 is then dropped within the well to activate the inner plug 162 when required, which comprises a degradation initiation operation.

The degradation initiation operation of the plug device 160 may include dropping a rod or bar (or dissolvable material) into the well from the surface to move the inner plug 162, or electronic activation, or applying pressure from the surface rupture a part of the plug device 160 to allow fluid to enter the chamber 22. In another arrangement, the protective coating of the inner plug 14 or the plug body 16 may be scraped or punctured, so that the well fluid comes into contact with the magnesium and starts the corrosion process. In such a manner the plug device 160 can be activated from above or below within the well depending on how the plug device 160 is set up, and depending on which way up the plug device 160 is located within the pipework. The pressure required to activate the plug device 160 (i.e. to remove the inner plug 14) can be adjusted according to the requirements from a very low pressure such as 1 PSI (6.9 kPa) and above to any well requirement to take account of the temperature and conditions within the well.

FIG. 10(b) shows the plug device 160 after the inner plug 162 has been activated as described above. Well fluid then contacts the uncoated surfaces of the chamber 22 to initiate the corrosion process as previously described. FIG. 10(c) shows the plug device 160 after the inner plug 14 has also been removed or ruptured as described above, for example by applying the predetermined pressure from above so that the inner plug 162, the ball 168, and inner plug 14 is pushed out of the plug body 16 so that they are free to fall into the well.

The arrangements of FIG. 10(b) allow a pressure seal to be maintained from below whilst the plug device 160 is dissolved over a period of typically two to three days, although a longer or a shorter period is also envisaged such as weeks or years depending the application. This allows pressure to be applied from above or from below the plug device 160 so that tasks within the well can be performed for a few days before over-pressuring in the region above the plug device 160 to push the inner plug 162, the ball 168, and the inner plug 14 out of the pipe as shown in FIG. 10(c). In one arrangement the pressure required to push the inner plug 14 out of the plug body 16 might be 5000 PSI (approx. 34500 kPa). It will be understood that such a pressure is for a particular temperature rating, such as up to 250° C. in these embodiments. The pressure required will typically depend on well conditions and the particular application required. The arrangements of FIG. 10 allow further options for operations and tasks within the well, for example, performing pressure testing of the pipework. It is envisaged that the plug device 160 of FIG. 10 would be useful plug and abandonment operations, but other uses for the plug device 160 are also envisaged.

It will be appreciated that in a similar manner to the previous embodiments, the plug device 160 is made of a degradable material and the surfaces of the plug device 160 that are in contact with well fluid (i.e. in the condition shown in FIGS. 10(a)) are coated so that they are protected from the corrosive effect of the well fluid. The internal surfaces of the chamber 22 are uncoated such that when the plug device 160 has been activated (as shown in FIGS. 10(b) and 10(c)) the well fluid enters the chamber 22 to contact the exposed surfaces of the plug device 160 (i.e. the plug body 16, the inner plug 162) to initiate the corrosion process as previously described. Once pushed out of the plug body 16 the inner plug 14 and the inner plug 162 are then free to fall into the well under gravity, or reside near to the plug device 160 if the well is horizontal. If the plug device 160 was entirely made of uncoated magnesium, it would start to corrode immediately on contact with well fluid, but through the use of the coatings on the various parts of the plug device 160 it is possible to prevent or inhibit corrosion of the magnesium alloy, and to provide a more controlled corrosion and operation of the plug device 160.

The method of operating the plug device 160 of FIG. 10 includes deploying the plug device 160 into a pre-installed pipe 10 within a well, and operating the slip assembly 143 to grip and seal the plug device 160 within the pipe 10. The method further includes moving the inner plug 162 so that well fluid is able to enter the chamber 22. The method includes removing the inner plug 162 and the inner plug 14 so that fluid is able to pass through the outer plug body 16.

The above embodiments of the plug device 110, 140, 160 provides the advantage that the blocking and the unblocking of a well pipe can be more readily controlled. The plug device 110, 140, 160 provides a more positive way to control the unblocking of a pipe 10, and in effect operates as a valve device to open part of the well. The plug device 110, 140, 160 may alternatively be termed a valve device or a bather device. It is envisaged that with the embodiments of the invention the plug device 110, 140, 160 may be in situ in the well for a period of 2 to 3 years, and possibly up to 10 years, before being activated to release the inner plug 14 and/or the end cap 142 from the plug body 16 and/or operation of the inner plug 162. It will be appreciated that after activation the time taken to degrade the inner plug 162, inner plug 14 and plug body 16 may depend on the material thickness, fluid type and temperature etc.

All of the embodiments described herein can be deployed into the well using wireline or set traditionally in a similar manner to a bridge plug, and then used as a bather within the well. It will be understood that rather than using milling tools or wire to recover or remove the plug devices described herein, they are subsequently activated so that fluid enters the chamber 22 to degrade or dissolve the plug devices from within. In effect the chamber 22 is a closed chamber until the degradation initiation operation has happened.

The invention claimed is:

1. A degradable plug device for a pipe having an outer plug body and an inner plug for preventing fluid flow through the pipe until the inner plug has been removed from the outer plug body, the outer plug body and the inner plug being of a degradable material, the inner plug having a chamber with at least one port to the exterior of the inner plug, the exposed surfaces of the degradable plug having a protective layer thereon, wherein the inner plug is disposable in at least a first position, in which the inner plug prevents said fluid flow through the pipe, and is adapted to undergo, in use, a degradation initiation operation such that fluid is able to enter the chamber via the at least one port to initiate corrosion or dissolution of the inner plug from inside the chamber, and wherein the outer plug body and the inner plug are connected to each other with a shear device.

2. A degradable plug device according to claim 1, wherein one or both of the chamber and the at least one port comprise one or more bores of the inner plug.

3. A degradable plug device according to claim 1, wherein said degradation initiation operation comprises moving the inner plug relative to the outer plug body between the first position and a second position, in which fluid is able to enter the chamber to initiate corrosion or dissolution of the inner plug from inside the chamber.

4. A degradable plug device according to claim 1, wherein the shear device is a shear ring, a shear pin, or a shear sleeve.

5. A degradable plug device according to claim 1, wherein the shear device is made of the degradable material.

6. A degradable plug device according to claim 1, wherein the inner plug is adapted to move out of the first position when a pressure of the fluid on one side of the inner plug exceeds a first pressure threshold, or wherein the inner plug is adapted to move out of first position when a force applied to one side of the inner plug exceeds a force threshold.

7. A degradable plug device according to claim 6, wherein the outer plug body and the inner plug are connected to each other with a shear device, wherein the shear device is adapted to fail when the pressure of the fluid on one side of the inner plug exceeds the first pressure threshold or when the force applied to the one side of the inner plug exceeds the force threshold, and wherein the inner plug is adapted, upon failure of the shear device, to be released from the outer plug body.

8. A degradable plug device according to claim 1, wherein one or both of:
(i) the internal surface of the chamber is uncoated with the protective layer, and
(ii) only the internal surface of the inner plug is uncoated with the protective layer and all surfaces of the outer plug body are coated with the protective layer.

9. A degradable plug device according to claim 1, wherein the protective layer comprises a corrosion-inhibiting coating.

10. A degradable plug device according to claim 1, wherein the degradation initiation operation comprises at least partially removing, in use, the protective layer at or near one end of the inner plug, thereby initiating corrosion or dissolution of the degradable material through contact with the fluid.

11. A degradable plug device according to claim 1, wherein, in use, after the inner plug has been removed from the outer plug body, the exposed regions of the outer plug body are in contact with the fluid, thereby initiating corrosion or dissolution of the outer plug body.

12. A degradable plug device according to claim 1, wherein the outer plug body comprises a tube, the inner plug being at one end of the tube, and wherein the chamber comprises a ring-shaped space between the inner plug and the outer plug body.

13. A degradable plug device according to claim 1, wherein the outer plug body comprises a tube, the inner plug being at one end of the tube, wherein the inner plug has a through-hole, and wherein the through-hole is in fluid communication with an inner space of the outer plug body.

14. A degradable plug device according to claim 13, wherein a mouth of the through-hole has a ball seat for location of a ball thereon to close the through-hole.

15. A degradable plug device according to claim 14, wherein the inner plug is adapted to move out of the first position when a pressure of the fluid on one side of the inner plug exceeds a first pressure threshold or wherein the inner plug is adapted to move out of the first position when a force applied to one side of the inner plug exceeds a force threshold, wherein an end cap and the inner plug are adapted to be removed from the outer plug body when the pressure of the fluid on one side of the end cap or the inner plug exceeds the first pressure threshold or when a force applied to the one side of the inner plug or the end cap exceeds the force threshold.

16. A degradable plug device according to claim 1, wherein an outer surface thereof comprises a slip assembly comprising one or more jaws and one or more sealing elements, the slip assembly for gripping and sealing the degradable plug device within the pipe.

17. A method of operating a degradable plug device for a pipe, the degradable plug device being according to claim 1, the method including:
disposing the inner plug in at least a first position, in which one or both of the inner plug and the outer plug body prevents said fluid flow through the pipe; and
performing a degradation initiation operation such that fluid is able to enter the chamber to initiate corrosion or dissolution of at least the inner plug from inside the chamber.

18. A method according to claim 17, wherein performing said degradation initiation operation comprises moving the inner plug relative to the outer plug body between the first position and a second position, in which fluid is able to enter the chamber to initiate corrosion or dissolution of the inner plug from inside the chamber.

19. A method according to claim 17, wherein moving the inner plug relative to the outer plug body comprises raising a pressure of the fluid on one side of the inner plug such that said pressure exceeds a first pressure threshold, to thereby move the inner plug out of the first position, or applying a force to one side of the inner plug such that the applied force exceeds a force threshold, to thereby move the inner plug out of the first position.

* * * * *